US010635931B2

(12) United States Patent
Shimauchi et al.

(10) Patent No.: US 10,635,931 B2
(45) Date of Patent: Apr. 28, 2020

(54) INFORMATION PROCESSING DEVICE, INFORMATION PROCESSING METHOD, AND PROGRAM

(71) Applicant: Sony Corporation, Tokyo (JP)

(72) Inventors: Kazuhiro Shimauchi, Tokyo (JP); Seijiro Inaba, Kanagawa (JP); Nobuho Ikeda, Kanagawa (JP); Hiroshi Ikeda, Kanagawa (JP); Shuichi Asajima, Tokyo (JP); Yuki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 15/516,796

(22) PCT Filed: Oct. 2, 2015

(86) PCT No.: PCT/JP2015/078057
§ 371 (c)(1),
(2) Date: Apr. 4, 2017

(87) PCT Pub. No.: WO2016/059978
PCT Pub. Date: Apr. 21, 2016

(65) Prior Publication Data
US 2017/0308771 A1    Oct. 26, 2017

(30) Foreign Application Priority Data
Oct. 14, 2014    (JP) ................. 2014-209971

(51) Int. Cl.
*G06K 9/00* (2006.01)
*G06K 9/62* (2006.01)
*G06K 9/32* (2006.01)

(52) U.S. Cl.
CPC ....... *G06K 9/6202* (2013.01); *G06K 9/00664* (2013.01); *G06K 9/00765* (2013.01);
(Continued)

(58) Field of Classification Search
CPC . G06T 2207/10016; G06T 2207/30241; G06T 7/38; G06T 3/20; G06T 3/4038;
(Continued)

(56) References Cited

U.S. PATENT DOCUMENTS 6,362,850 B1 *  3/2002  Alsing ............... H04N 5/23293
                                                           348/239
6,587,119 B1 *  7/2003  Anderson .......... H04N 5/23293
                                                           345/473
(Continued)

FOREIGN PATENT DOCUMENTS

CN    101276363 A    10/2008
CN    101753771 A    6/2010
(Continued)

OTHER PUBLICATIONS

Liu, Hao, Xing Xie, Wei-Ying Ma, and Hong-Jiang Zhang. "Automatic browsing of large pictures on mobile devices." In Proceedings of the eleventh ACM international conference on Multimedia, pp. 148-155. ACM, 2003. (Year: 2003).*

(Continued)

*Primary Examiner* — Carol Wang
(74) *Attorney, Agent, or Firm* — Michael Best & Friedrich LLP

(57) ABSTRACT

The present technology relates to an information processing device, an information processing method, and a program that are designed to enable easy generation of a path for successively displaying characteristic images. The information processing device includes a setting unit that sets a path for connecting characteristic portions in at least one image by referring to metadata including at least information about feature points detected from the image. The setting unit sets the path by determining a regression curve, using the feature points. In a case where the feature points include a feature point at a distance equal to or longer than a predetermined
(Continued)

threshold value from the regression curve, the setting unit redetermines the regression curve after removing a feature point detected from an image including a feature point having a low score among the feature points. The present technology can be applied to information processing devices that process still images and moving images.

17 Claims, 36 Drawing Sheets

(52) U.S. Cl.
CPC ......... *G06K 9/3233* (2013.01); *G06K 9/6215* (2013.01); *G06K 9/6284* (2013.01); *G06K 2209/27* (2013.01)

(58) Field of Classification Search
CPC ....... G06K 2009/2045; G06K 2009/27; G06K 9/00026; G06K 9/6202; G06K 9/3233; G06K 9/00664; G06K 9/00765; G06K 9/6215; G06K 9/6284
See application file for complete search history.

(56) References Cited

U.S. PATENT DOCUMENTS

| | | | |
|---|---|---|---|
| 6,741,250 B1 | 5/2004 | Furlan et al. | |
| 6,924,832 B1 | 8/2005 | Shiffer et al. | |
| 8,917,951 B1* | 12/2014 | Chen | G06K 9/6202 382/218 |
| 9,998,663 B1* | 6/2018 | Francois | H04N 5/23238 |
| 10,248,756 B2* | 4/2019 | Yu | G16H 50/50 |
| 2003/0020966 A1* | 1/2003 | Yashiro | G11B 27/034 358/496 |
| 2004/0240707 A1* | 12/2004 | Aliaga | G06K 9/6203 382/103 |
| 2010/0021065 A1* | 1/2010 | Sibiryakov | G06T 3/4038 382/190 |
| 2010/0066745 A1* | 3/2010 | Tsuda | G06K 9/00228 345/473 |
| 2011/0074819 A1* | 3/2011 | Yamaji | G06F 16/583 345/634 |
| 2013/0124951 A1* | 5/2013 | Shechtman | G06T 13/80 715/201 |
| 2014/0043473 A1* | 2/2014 | Gupta | H04N 17/00 348/135 |
| 2014/0118405 A1* | 5/2014 | Chand | G06F 16/9537 345/661 |
| 2014/0369563 A1* | 12/2014 | Kalevo | H04N 5/232 382/103 |
| 2015/0261752 A1* | 9/2015 | Li | G06F 16/48 707/738 |
| 2016/0148417 A1* | 5/2016 | Kim | G05D 1/0044 345/419 |

FOREIGN PATENT DOCUMENTS

| | | |
|---|---|---|
| CN | 101901335 A | 12/2010 |
| JP | 2002-509662 A | 3/2002 |
| JP | 2006-081205 A | 3/2006 |
| JP | 2006-304090 A | 11/2006 |
| JP | 2011-090258 A | 5/2011 |
| JP | 2012053309 A | 3/2012 |

OTHER PUBLICATIONS

Deselaers, Thomas, Philippe Dreuw, and Hermann Ney. "Pan, zoom, scan—time-coherent, trained automatic video cropping." In 2008 IEEE Conference on Computer Vision and Pattern Recognition, pp. 1-8. IEEE, 2008. (Year: 2008).*
Chinese Office Action dated Jul. 18, 2019 for corresponding Chinese Application No. 201580054474.7.

* cited by examiner

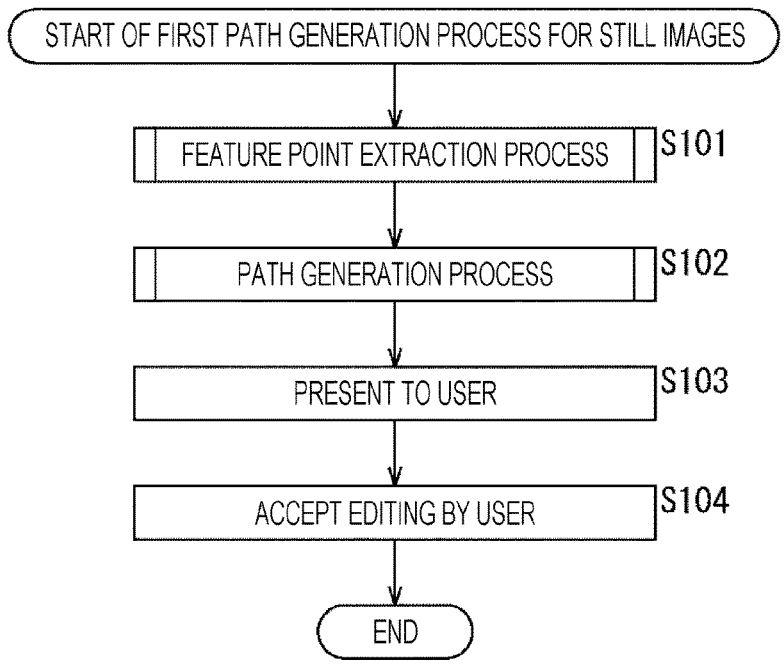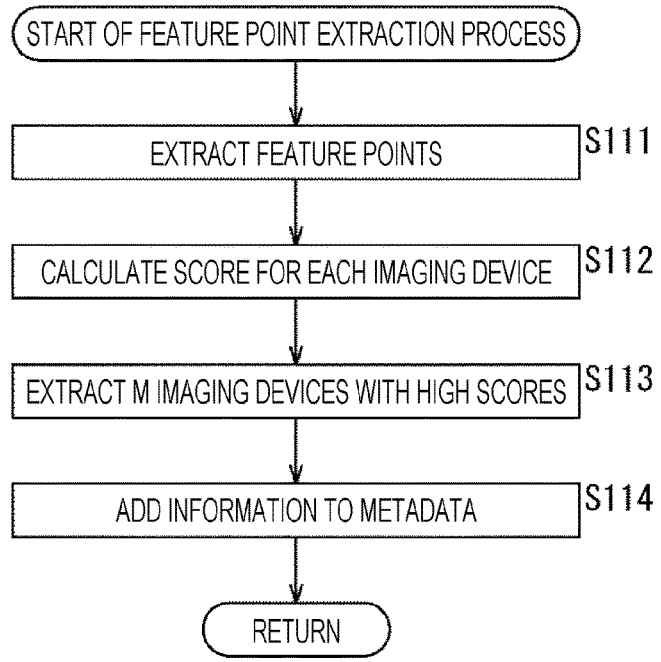

FIG. 18

| LOCATION INFORMATION ABOUT IMAGING DEVICES | ANGLES OF VIEW OF IMAGING DEVICES | SCORE (TOTAL SCORE) |
|---|---|---|
| LOCATION INFORMATION ABOUT FEATURE POINTS | SCORES OF RESPECTIVE FEATURE POINTS | |

331

INFORMATION PROCESSING DEVICE, INFORMATION PROCESSING METHOD, AND PROGRAM

TECHNICAL FIELD

The present technology relates to an information processing device, an information processing method, and a program. Particularly, the present technology relates to an information processing device that generates a path for enabling efficient viewing of images, an information processing method, and a program.

BACKGROUND ART

Imaging devices that can take still images and moving images have increased in number recently, and more and more users casually perform imaging. Also, users often post captured images on the Internet or the like these days. Thus, as the opportunities to capture images and put such images on public display are increasing, a large number of images of various kinds are provided to users. Therefore, there is a demand for efficient viewing of images on the users' side.

Patent Document 1 has suggested providing users with moving tours using still images.

CITATION LIST

Patent Document

Patent Document 1: JP 2002-509662 W

SUMMARY OF THE INVENTION

Problems to be Solved by the Invention

Conventional data for successively providing users with images is manually created. Since the creation of such data is troublesome, there is a demand for easy data creation.

The present technology has been made in view of those circumstances, and aims to readily generate a path for enabling a user to efficiently view characteristic images among a large number of images.

Solutions to Problems

An information processing device according to an aspect of the present technology includes a setting unit that sets a path for connecting characteristic portions in at least one image by referring to metadata including at least information about feature points detected from the image.

The setting unit may set the path by determining a regression curve, using the feature points.

In a case where the feature points include a feature point at a distance equal to or longer than a predetermined threshold value from the regression curve, the setting unit may redetermine the regression curve after removing a feature point detected from an image including a feature point having a low score among the feature points.

In a case where the feature points include a feature point at a distance equal to or longer than a predetermined threshold value from the regression curve, the setting unit may redetermine the regression curve after removing a feature point having a low score among the feature points.

The setting unit may determine a regression curve by using the feature points, divide the determined regression curve into sections, determine differential values for the respective sections, and, when at least one of the differential values is equal to or smaller than a predetermined threshold value, redetermine the regression curve after increasing the order for determining the regression curve.

The image may be a moving image.

The setting unit may set an effect period for providing an effect, the effect period being a period in which feature points in a divisional period obtained by dividing the moving image into periods satisfy a predetermined condition.

The predetermined condition may be that the number of feature points in the divisional period is equal to or larger than a threshold value.

The effect may be a time-slice effect.

The effect may be an effect to display a scene captured from different angles in the same period.

The setting unit may set a chronological path outside the effect period.

In a case where the at least one image is images, and the images are classified into a unified group including an image having an imaging range overlapping the imaging range of another image and an isolated group having an imaging range not overlapping the imaging range of any other image, the setting unit may set a global path for all the images in the unified group, and set a local path for each image in the unified group.

An information processing method according to one aspect of the present technology includes the step of setting a path for connecting characteristic portions in at least one image by referring to metadata including at least information about feature points detected from the image.

A program according to one aspect of the present technology is a computer-readable program for causing a computer to perform a process including the step of setting a path for connecting characteristic portions in at least one image by referring to metadata including at least information about feature points detected from the image.

With an information processing device, an information processing method, and a program according to one aspect of the present technology, metadata including at least information about feature points detected from at least one image is referred to, and a path for connecting characteristic portions in the image is then set.

Effects of the Invention

According to one aspect of the present technology, a path for enabling a user to efficiently view characteristic images among a large number of images can be readily generated.

It should be noted that effects of the present technology are not limited to the effects described above, and may include any of the effects described in the present disclosure.

BRIEF DESCRIPTION OF DRAWINGS

FIG. 9 is a flowchart for explaining a first path generation process for still images.

FIG. 10 is a flowchart for explaining the first path generation process for still images.

FIG. 18 is a diagram for explaining metadata.

MODES FOR CARRYING OUT THE INVENTION

Figure 1:
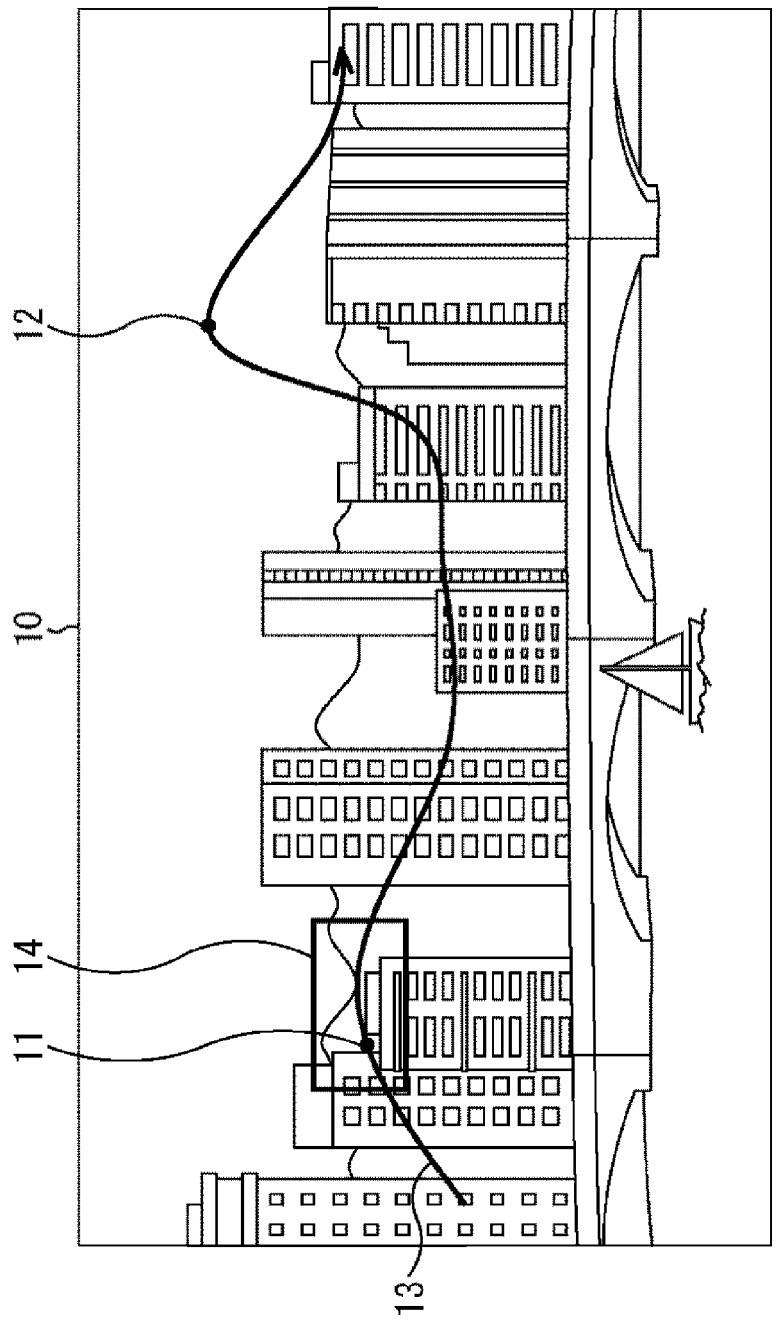
FIG. 1 is a diagram for explaining a path.

The following is a description of modes (hereinafter referred to as embodiments) for carrying out the present technology. It should be noted that the description will be made in the following order.
1. Explanation of paths
2. Configuration of a system
3. Configuration and functions of an information processing device
4. First process for still images
5. Second process for still images
6. Processes for moving images
7. First process for moving images
8. Second process for moving images
9. Third process for moving images
10. Fourth process for moving images
<Explanation of Paths>

As will be described below, the present technology can be applied in generating a path for enabling a user to successively view images. First, such paths are explained.

FIG. 1 is a diagram showing an example where feature points are detected from a high-quality image, and a path that connects images including the detected feature points. A high-quality image is a still image or a moving image taken with a high-resolution imaging device. In the description below, images include still images and moving images.

It should be noted that, in this specification, a feature point may be a dot (one pixel), but a feature point may be an area of a predetermined size formed with multiple pixels. That is, characteristic areas of a predetermined size may be detected, and a path that connects the areas may be generated.

Feature points are detected from a high-quality image 10. FIG. 1 shows a state where two feature points 11 and 12 are detected. A dot (or an area) to be detected as a feature point is a spot where moving objects such as people gather in the image 10, a point at which people are looking in the image 10, a spot about which information has been often posted on social networking services (SNSs), or a spot at which a certain event or action is supposedly taking place, for example.

Also, a dot (or an area) to be detected as a feature point may be a high-contrast portion such as a sign board or an illuminated spot, or an area including a vanishing point. Further, in a case where the image 10 is a moving image, changes in luminance or the like may be measured in the temporal direction, and areas with large changes may be detected.

Alternatively, an object or a person being imaged from the front side may be detected as an area, or a certain person or object may be tracked to detect the results of the tracking as areas. Further, not only images but also sound information such as areas with a great ringing sound may be detected as feature points.

Features other than the above mentioned examples may be detected.

A path 13 that connects detected feature points is generated. In the example shown in FIG. 1, the path 13 extending through the feature point 11 and the feature point 12 is set. The path 13 is a path that smoothly connects the feature point 11 and the feature point 12. In a case where images are presented to the user in accordance with the path 13 generated in this manner, the image 10 is not presented to the user as it is, but images located on the path 13 are successively provided to the user in accordance with the path 13.

For example, a window 14 of a predetermined size moves along the path 13, and images in the window 14 are provided to the user.

As such a path 13 is generated, and images based on the path 13 are provided to the user, the user can efficiently view characteristic areas in the image 10.

Figure 2:
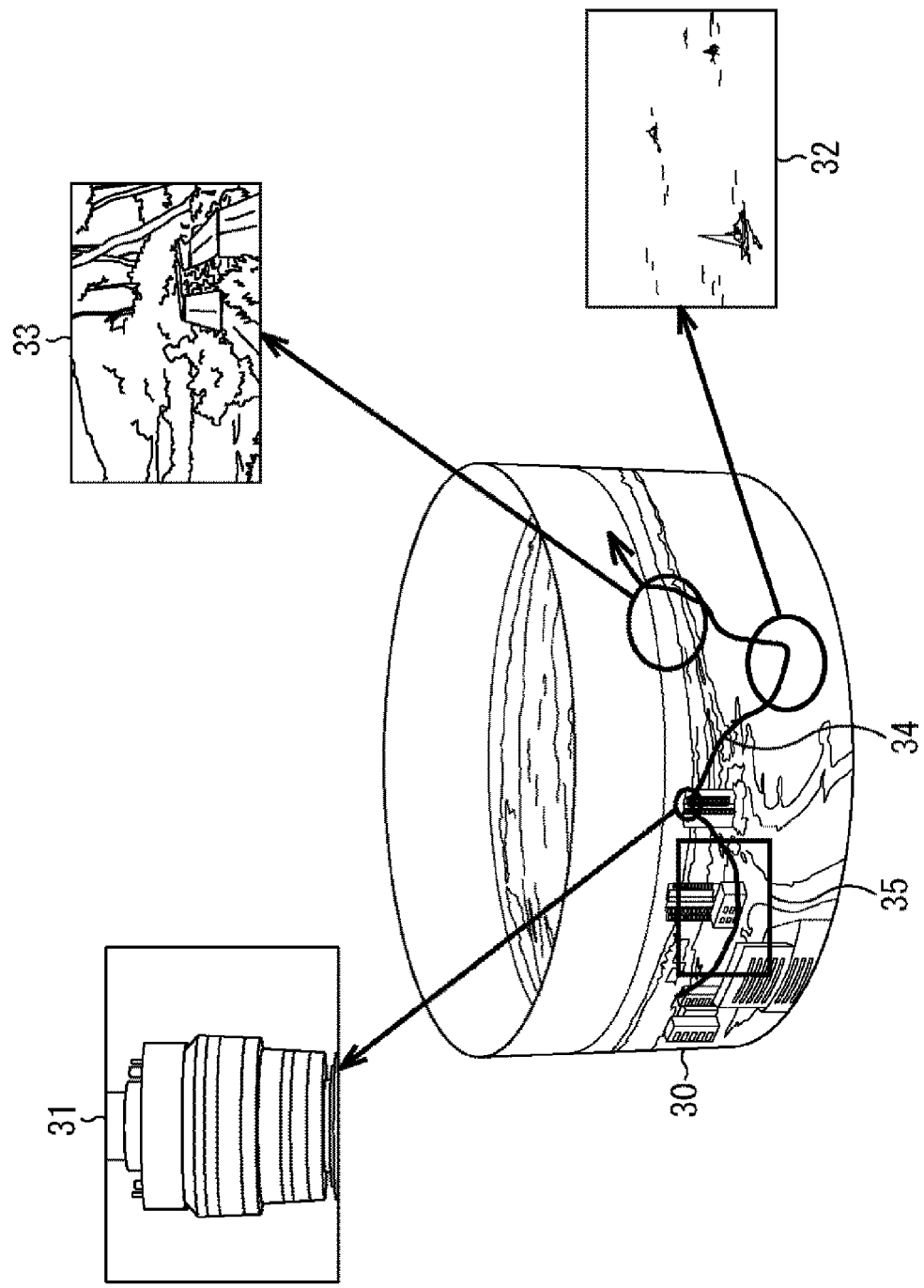
FIG. 2 is a diagram for explaining a path.

FIG. 2 is a diagram showing an example where a 360-degree image 30 around a predetermined position is acquired, areas including characteristic images are detected from the 360-degree image 30, and a path that connects the detected areas is generated.

The 360-degree image 30 may be an image formed by installing monocular imaging devices and combining images taken with those imaging devices, an image formed by combining images taken with a single monocular imaging device, or an image taken with an imaging device that can take a 360-degree image around the center point in one process, for example. It should be noted that the 360-degree image may include only side images without any top and bottom images as shown in FIG. 2, or may be a spherical image.

Feature points are detected from such a 360-degree image 30. In this example, a feature point 31, a feature point 32, and a feature point 33 are detected. A path 34 that extends through the feature points 31 through 33 is generated. In a case where the image 30 is presented to the user, a window 35 moves along the path 34 generated in such a manner, and images in the window 35 are presented to the user. At this point, images including the feature points, 31, 32, and 33 are presented to the user.

In the example case shown in FIG. 2, the user can efficiently view characteristic areas in the image 30, as in the case shown in FIG. 1.

Figure 3:
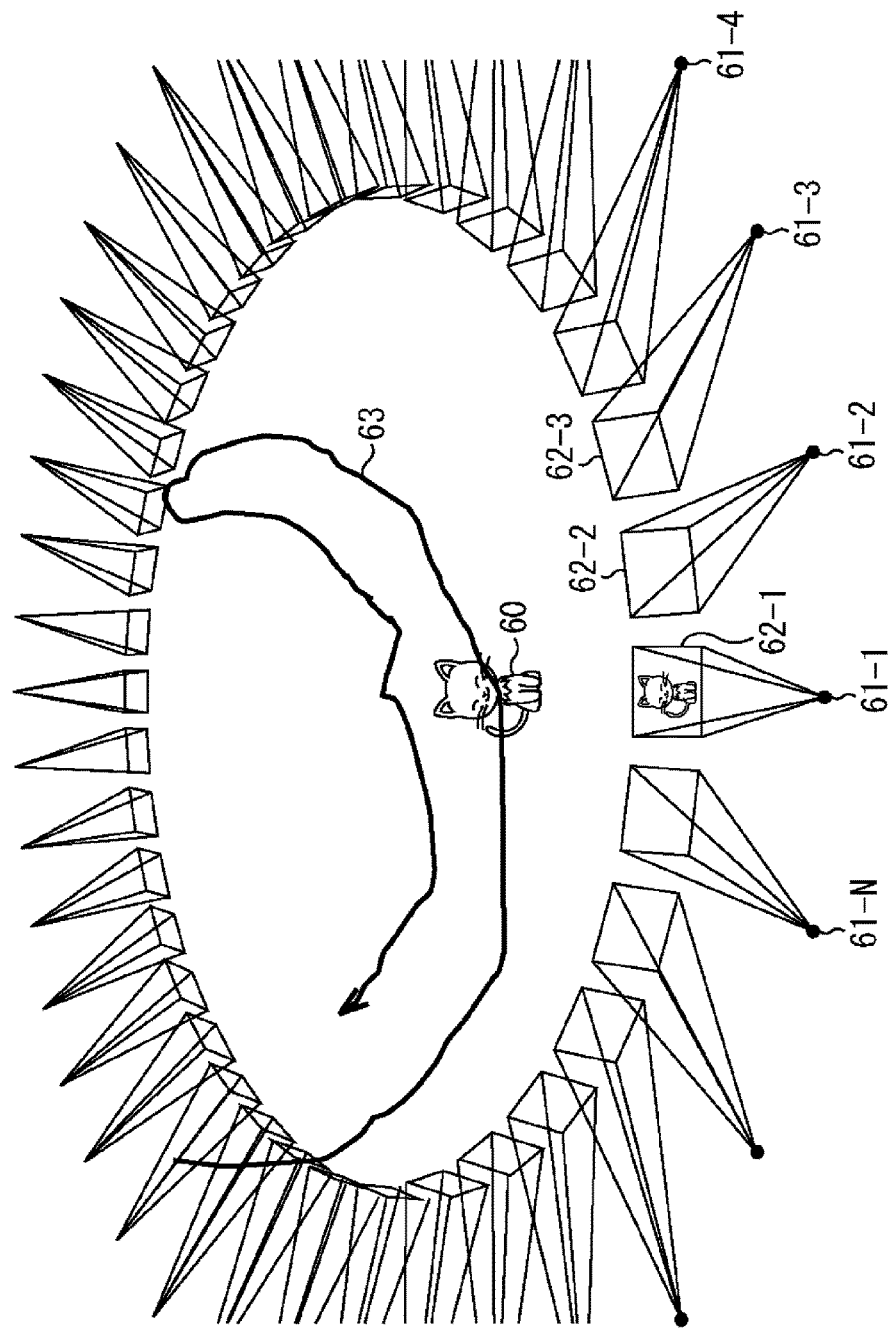
FIG. 3 is a diagram for explaining a path.

FIG. 3 is a diagram showing an example where imaging devices 61 are installed around a predetermined object 60, characteristic portions are detected from images 62 taken with the respective imaging devices 61, and a path 63 that connects the detected portions is generated.

The example shown in FIG. 3 is an example in which the present technology can be applied when imaging devices are installed to surround a field at a sport stadium or the like. In the example shown in FIG. 3, N imaging devices, or imaging devices 61-1 through 61-N, are installed around the object 60. In the description below, the imaging devices 61-1 through 61-N will be written simply as the imaging devices 61, unless there is a need to distinguish the imaging devices 61-1 through 61-N from one another. Further, other portions will be written in a similar manner.

Images 62-1 through 62-N are taken with the respective imaging devices 61-1 through 61-N. Feature points (not shown) are detected from respective formed images 62. In this case, images 62 including the feature points may be detected from the N images, which are the images 62-1 through 62-N, and these images 62 may be the current targets to be processed at the time of path generation. Alternatively, feature points may be detected from the respective images of the images 62-1 through 62-N, and these feature points may be the current targets to be processed at the time of path generation.

The path 63 that connects the images 62 (the imaging devices 61) detected as images (portions) including the feature points or connects the feature points in the images 62 is generated. In a case where the images 62 including the feature points are the current targets to be processed, or in a case where the imaging devices 61 that have taken the images 62 including the feature points are the current targets to be processed, images that sequentially switch the imaging devices 61 existing in the path 63 are provided to the user. In a case where the feature points are the current targets to be processed, images including the feature points existing in the path 63 are sequentially cut out from the images 62 including the feature points, and are then provided to the user.

When the present technology is applied in a case where imaging devices are installed to surround a field at a sports stadium or the like as described above, images of an exciting scene such as a goal-scoring scene taken from an optimum position can be successively provided to the user.

Figure 4:
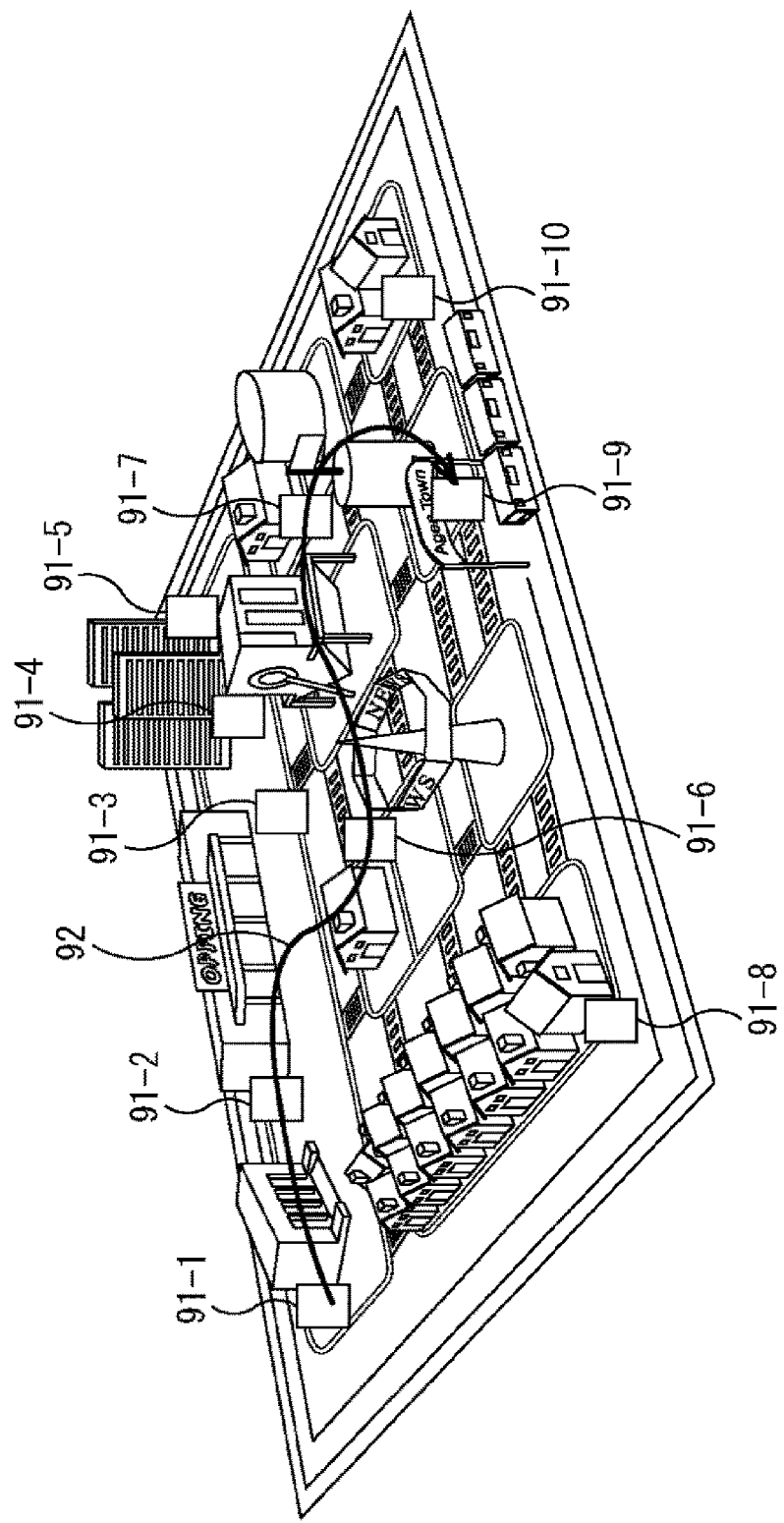
FIG. 4 is a diagram for explaining a path.

In the example shown in FIG. 4, multiple imaging devices are installed as in the example shown in FIG. 3. However, in the situation shown in FIG. 4, the imaging devices are scattered in a town or the like. In the example shown in FIG. 4, ten imaging devices 91, or imaging devices 91-1 through 91-10, take images of streets and buildings, for example.

The imaging devices 91 that take portions (images) including feature points are detected from the respective images taken with the imaging devices 91-1 through 91-10. A path 92 that connects the detected feature points is generated. A path 92 that connects the feature points may be generated, or a path 92 that connects the images (the imaging devices 91) including the feature points may be generated.

As the imaging devices 91 that exist in the generated path 92 and take images are sequentially switched, or as images in predetermined areas in the images taken with the imaging devices 91 are sequentially switched, images are provided to the user.

As images are provided to the user in this manner, images of popular places where people gather can be successively provided to the user so that the user feels as if he/she were actually walking in the town.

Figure 5:
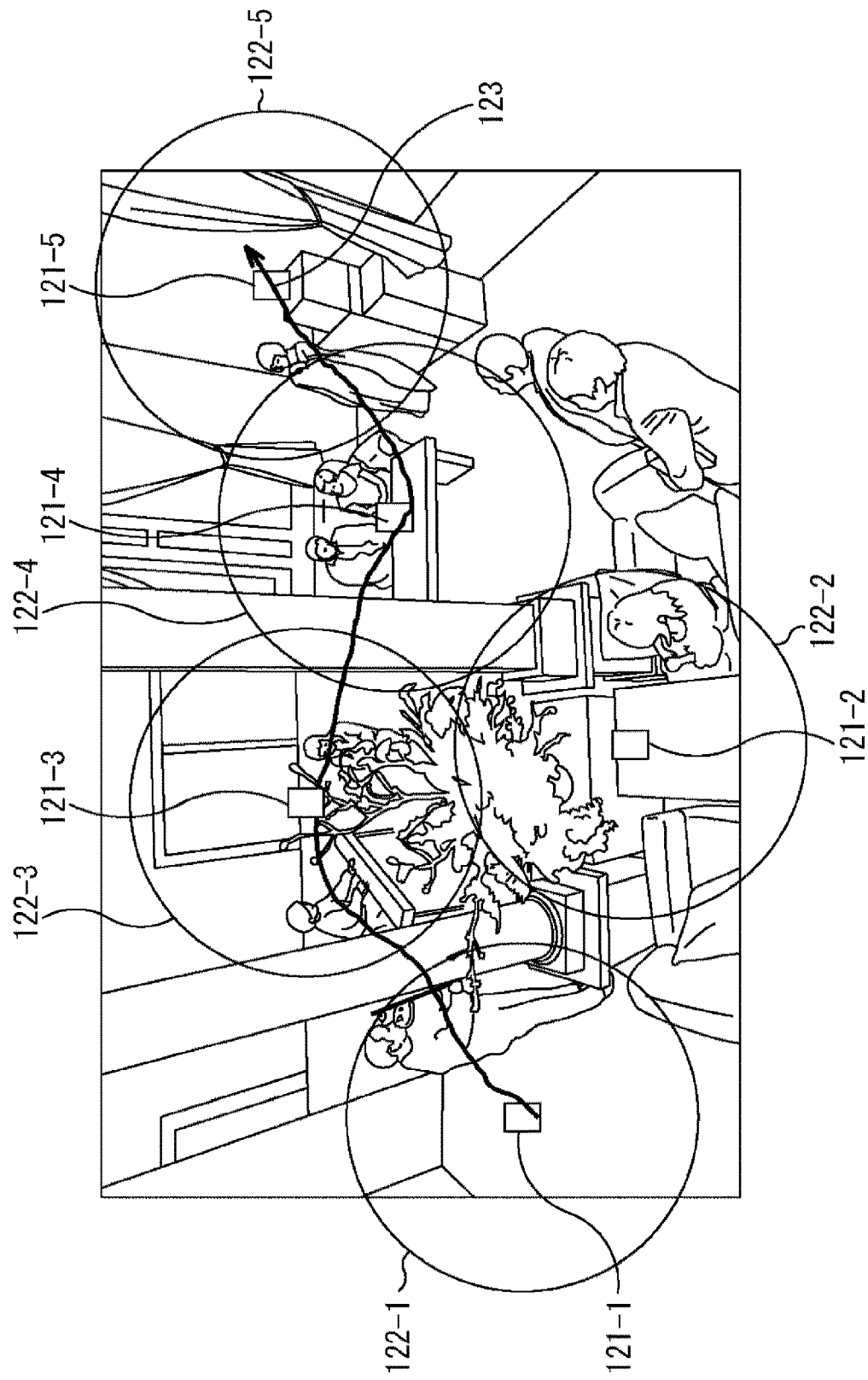
FIG. 5 is a diagram for explaining a path.

The example shown in FIG. 5 is a situation where multiple imaging devices are installed in a place such as a party room, as in the example shown in FIG. 4. In the example shown in FIG. 5, imaging devices 121-1 through 121-5 are installed in a predetermined site. The imaging devices 121 are imaging devices that take images of predetermined ranges, and the ranges are surrounded by circles in FIG. 5.

The imaging device 121-1 takes an image in a range 122-1, with the center being the imaging device 121-1. The imaging device 121-2 takes an image in a range 122-2, with the center being the imaging device 121-2. The imaging device 121-3 takes an image in a range 122-3, with the center being the imaging device 121-3. The imaging device 121-4 takes an image in a range 122-4, with the center being the imaging device 121-4. The imaging device 121-5 takes an image in a range 122-5, with the center being the imaging device 121-5.

The imaging devices 121 may be imaging devices that can take images in 360-degree ranges around the imaging devices 121 and are called spherical imaging devices or the like. An example case where such spherical imaging devices are used is described herein. In the description that will be continued below, the imaging devices are attached to the ceiling, and take images in the ranges 122 toward the floor.

It should be noted that, in the ranges 122, the images of the faces of persons can be taken in such sizes that the faces can be recognized by face recognition software or the like. Alternatively, the ranges 122 are circles that are at a predetermined distance from the respective centers that are the imaging devices 121.

In FIG. 5, the imaging device 121-1, the imaging device 121-3, the imaging device 121-4, and the imaging device 121-5 are detected as the imaging devices 121 that take characteristic images (portions), and a path 123 that connects these imaging devices 121 is generated. Images from the imaging devices 121 existing in the path 123 are sequentially switched and provided to the user.

Alternatively, a path 123 that sequentially connects the feature points existing in the ranges 122 may be generated, though the feature points are not shown in the drawing.

As images are provided to the user in this manner, images of popular places where people gather can be provided, for example, as in the case shown in FIG. 4.

In the description below, an inter-imager distance is a distance between adjacent imaging devices. In the case shown in FIG. 5, the distance between the imaging device 121-1 and the imaging device 121-2 is an inter-imager distance, for example.

Also, as for an image overlap, there is an overlap between the range 122-3 of the imaging device 121-3 and the range 122-4 of the imaging device 121-4 in FIG. 5, for example. In such a case, there is an image overlap.

<Configuration of a System>

Figure 6:
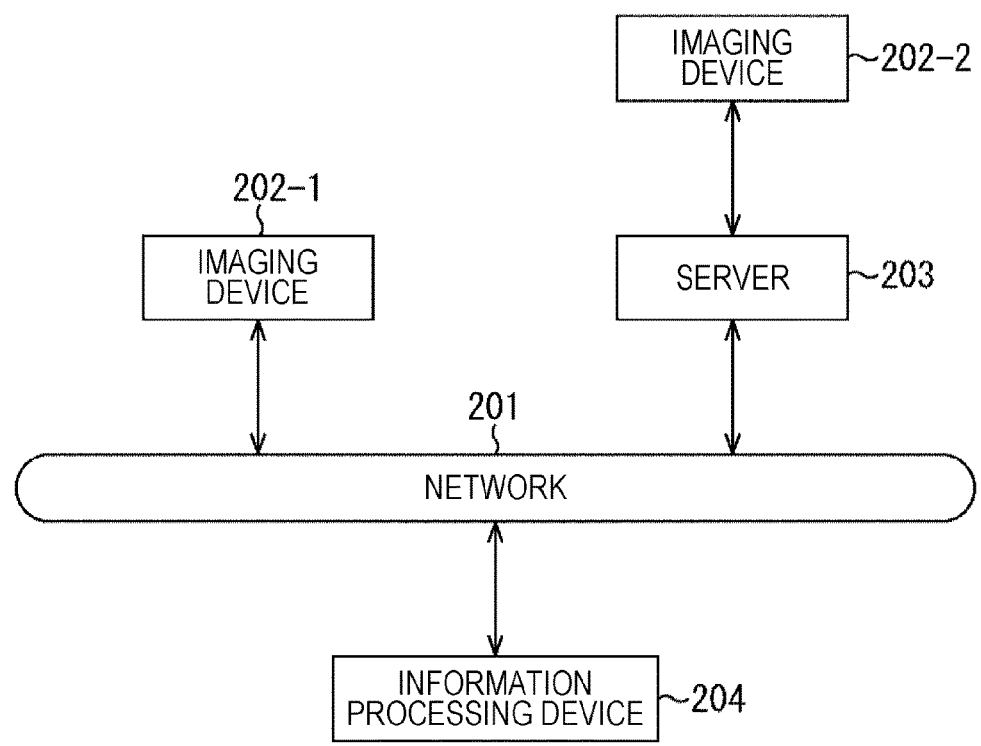
FIG. 6 is a diagram for explaining the configuration of a system.

A system that detects such characteristic images and generates a path for connecting the detected images is now described. FIG. 6 is a diagram showing the configuration of an information processing system. The information processing system includes a network 201, an imaging device 202-1, an imaging device 202-2, a server 203, and an information processing device 204.

The network 201 is a network that includes the Internet or a local area network (LAN), and is formed with cables or is formed in a wireless manner. The imaging devices 202 are the imaging devices 121 in FIG. 5, for example. Although only two imaging devices 202 are shown in FIG. 6, there are multiple imaging devices 202 in the system.

The imaging device 202-1 is connected to the network 201 so as to be able to exchange data with other devices connected to the network 201. The imaging device 202-2 is connected to the server 203, and is designed to be able to exchange data with the server 203.

The data of an image taken with the imaging device 202-2 is supplied to the server 203, and is supplied to the information processing device 204 via the network 201 as necessary.

The information processing device 204 is a device that generates the above described paths. It should be noted that, although the information processing device 204 generates paths in the description below, the server 203 may generate paths.

<Configuration and Functions of the Information Processing Device>

Figure 7:
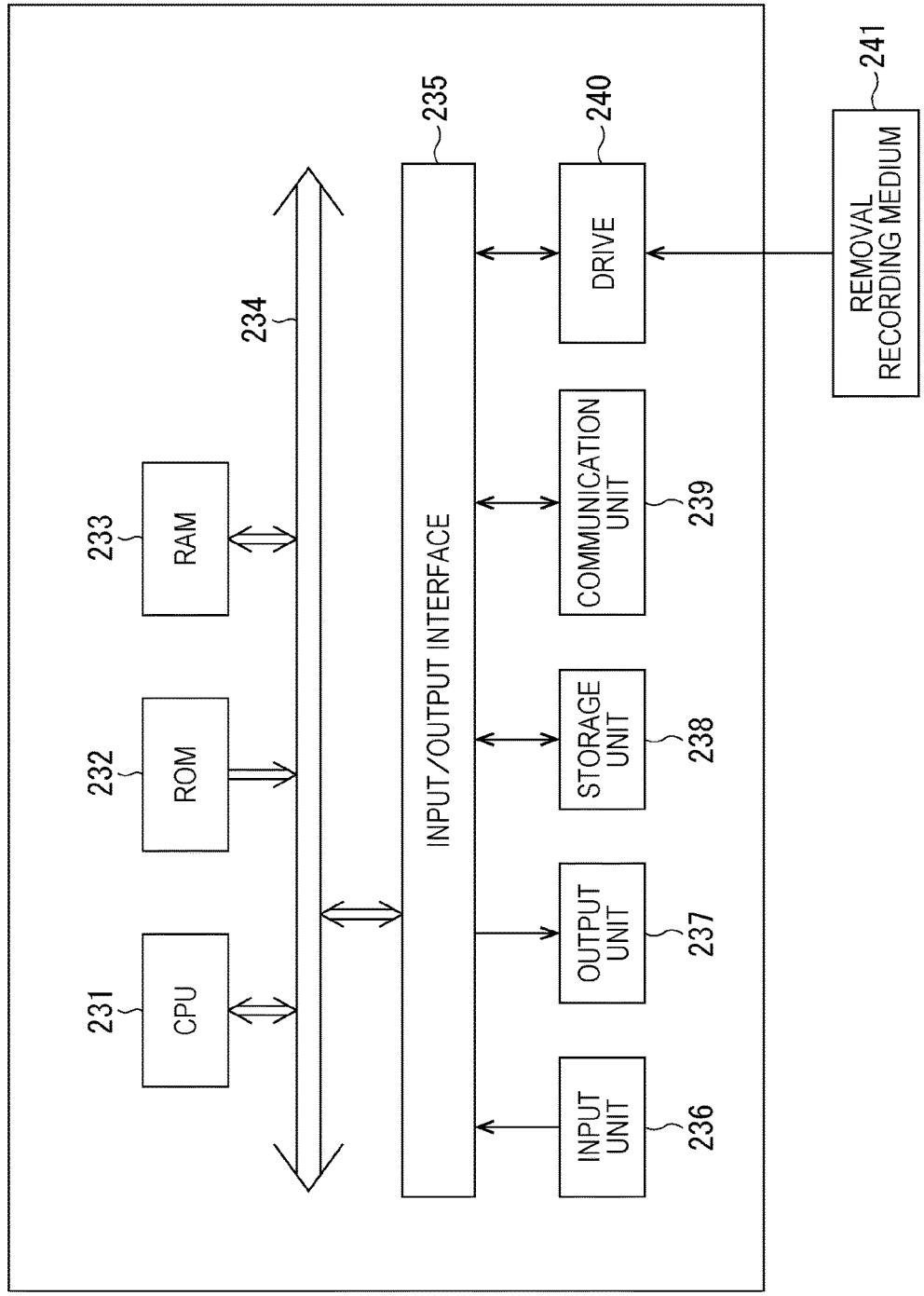
FIG. 7 is a diagram for explaining the configuration of an information processing device.

FIG. 7 is a diagram showing the configuration of the information processing device 204. The information processing device 204 may be formed with a personal computer, for example.

In the information processing device 204, a central processing unit (CPU) 231, a read only memory (ROM) 232, and a random access memory (RAM) 233 are connected to one another by a bus 234. An input/output interface 235 is further connected to the bus 234. An input unit 236, an output unit 237, a storage unit 238, a communication unit 239, and a drive 240 are connected to the input/output interface 235.

The input unit 236 is formed with a keyboard, a mouse, a microphone, and the like. The output unit 237 is formed with a display, a speaker, and the like. The storage unit 238 is formed with a hard disk, a nonvolatile memory, or the like. The communication unit 239 is formed with a network interface or the like. The drive 240 drives a removable recording medium 241, such as a magnetic disk, an optical disk, a magnetooptical disk, or a semiconductor memory.

In the information processing device 204 having the above described configuration, the CPU 231 loads a program stored in the storage unit 238 into the RAM 233 via the input/output interface 235 and the bus 234, for example, and executes the program, so that the series of processes described below are performed.

The program to be executed by the CPU 231 of the information processing device 204 may be recorded on the removable recording medium 241 as a packaged medium to be provided, for example. Alternatively, the program can be provided via a wired or wireless transmission medium, such as a local area network, the Internet, or digital satellite broadcasting.

In the information processing device 204, the program may be installed into the storage unit 238 via the input/output interface 235 when the removable recording medium 241 is mounted on the drive 240. The program can also be received by the communication unit 239 via a wired or wireless transmission medium, and be installed into the storage unit 238. Other than the above, the program may be installed beforehand into the ROM 232 or the storage unit 238.

Figure 8:
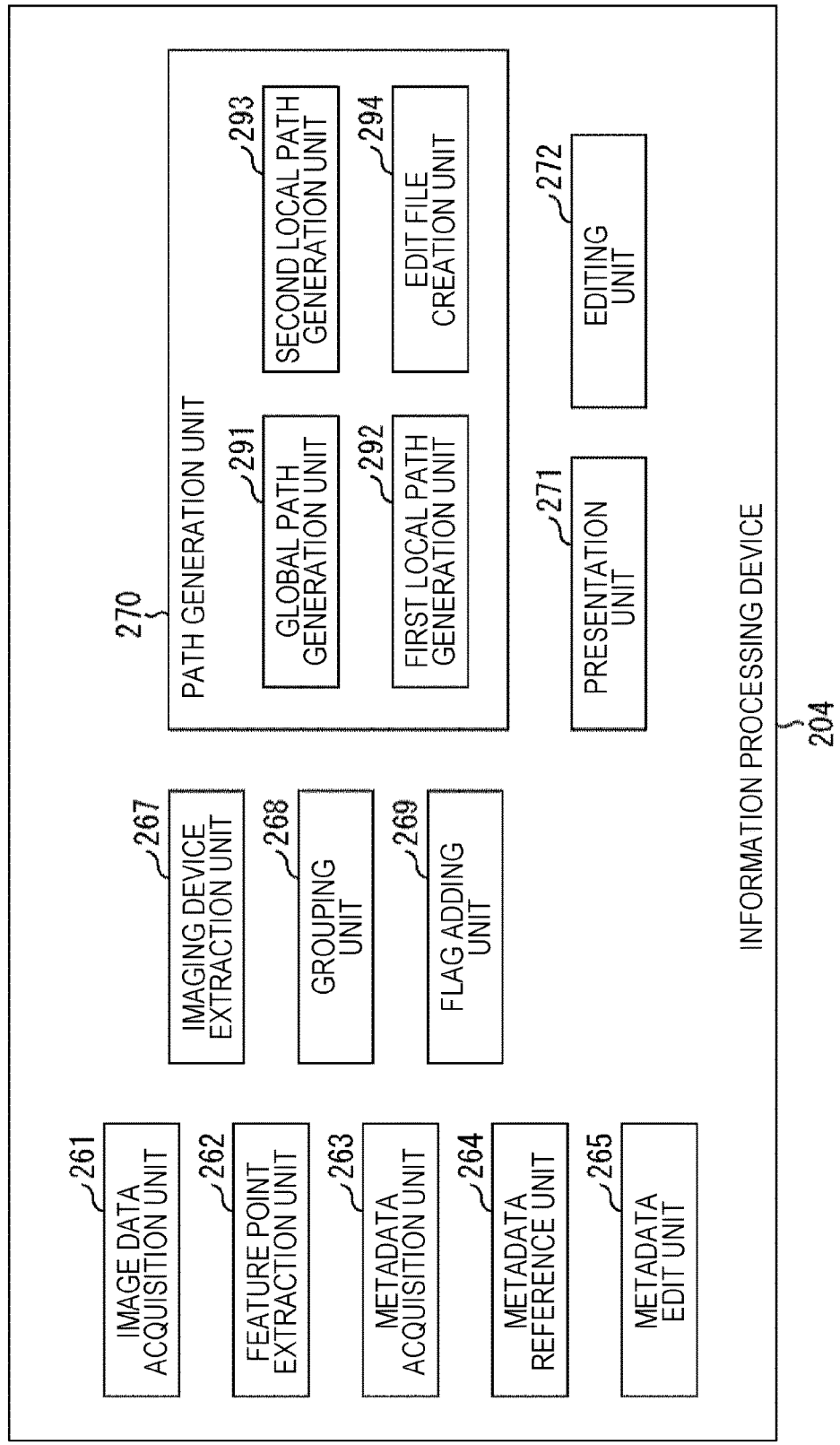
FIG. 8 is a diagram for explaining the functions of the information processing device.

FIG. 8 is a diagram showing the functions of the information processing device 204. The functions shown in FIG. 8 may be the functions to be obtained when the program is executed, or may be the functions to be obtained as hardware, as described above.

An image data acquisition unit 261 is formed with a wireless communication function such as Wi-Fi, or a removable recording medium reproduction function, for example.

The image data acquisition unit 261 controls the communication unit 239 (FIG. 7), to acquire the image data of an image that has been taken with the imaging device 202-1 and is supplied from the imaging device 202-1 (FIG. 6) via the network 201. The image data acquisition unit 261 also controls the communication unit 239 (FIG. 7), to acquire the image data of an image that has been taken with the imaging device 202-2 and is supplied from the server 203. The acquired data is temporarily stored into the storage unit 238 (FIG. 7) as necessary.

The image data acquisition unit 261 may also control the drive 240, to acquire image data being managed by the information processing device 204, such as image data stored in the storage unit 238 (FIG. 7) or image data stored in the removable recording medium 241 (FIG. 7).

A feature point extraction unit 262 extracts feature points by performing an image analysis on acquired image data. The feature points are like the points described above with reference to FIG. 1.

A metadata acquisition unit 263 is formed with a wireless communication function such as Wi-Fi, or a removable recording medium reproduction function, for example.

The metadata acquisition unit 263 controls the communication unit 239 (FIG. 7), to acquire metadata that includes the location information about the imaging device 202 and is supplied from the imaging device 202-1 (FIG. 6) via the network 201. The metadata acquisition unit 263 also controls the communication unit 239 (FIG. 7), to acquire metadata that includes the location information about the imaging device 202-2 and is supplied from the server 203. The acquired data is temporarily stored into the storage unit 238 (FIG. 7) as necessary.

The metadata acquisition unit 263 may also control the drive 240, to acquire metadata being managed by the information processing device 204, such as metadata that includes the location information about the imaging devices 202 and is stored in the storage unit 238 (FIG. 7), or metadata that includes the location information about the imaging devices 202 and is stored in the removable recording medium 241 (FIG. 7).

Metadata is data that includes data to be referred to when the later described paths are generated, and information necessary at the time of path generation is added to the metadata as appropriate. Further, as will be described later, information about a generated path is written in an edit file. Part of the information written in this edit file is information written in the metadata.

A metadata edit unit 265 adds information about features points extracted by the feature point extraction unit 262 or information about a path generated by a path generation unit 270 to metadata that includes information about an imaging device, or deletes information that has become unnecessary after path generation from metadata.

It should be noted that, in this description that will be continued below, the information processing device 204 includes the feature point extraction unit 262 that extracts feature points by analyzing image data, and the metadata edit unit 265 adds the feature points to metadata. However, the server 203 may include the feature point extraction unit 262.

In a case where the server 203 includes the feature point extraction unit 262, the server 203 receives image data from the imaging device 202-2, analyzes the image data, and detects feature points. The server 203 further generates information about the detected feature points, generates metadata including at least the location information about the imaging device 202-2, and, in accordance with a request from the information processing device 204, supplies the generated metadata to the information processing device 204.

In this case, the information processing device 204 also acquires the information about the feature points when acquiring the metadata through the metadata acquisition unit 263. The system may be designed so that the server 203 generates metadata including information about extraction of feature points and an image.

It should be noted that, in the description that will be continued below, the information processing device 204 has the functions shown in FIG. 8. However, image data and metadata recorded in the server 203 or on a recording medium might be acquired as they are. Therefore, an information processing device 204 that does not include functions such as the image data acquisition unit 261, the feature point extraction unit 262, the metadata acquisition unit 263, a metadata reference unit 264, and the metadata edit unit 265 can also generate paths.

For example, image data and metadata may be associated with each other in advance, and the path generation unit 270 may refer to such information. In such a configuration, the information processing device 204 should include the path generation unit 270.

The functions and the configuration described herein are merely an example, and do not limit the present technology. Even an information processing device 204 that does not include a predetermined one of the functions shown in FIG. 8 falls within the scope of the present technology. Alternatively, the functions shown in FIG. 8 may be divided into multiple devices in some configurations.

Referring back to FIG. 8, the description of the functions of the information processing device 204 is continued. The metadata reference unit 264 refers to metadata acquired by the metadata acquisition unit 263, or metadata to which information has been added by the metadata edit unit 265.

An imaging device extraction unit 267 extracts imaging devices when a path is generated. Although will be described later in detail, imaging devices that take images including a large number of feature points are extracted.

A grouping unit 268 divides the imaging devices into groups. From the positional relationship among the imaging devices, the grouping unit 268 determines whether image devices are adjacent to each other, or whether imaging devices are non-adjacent to each other. In accordance with a result of the determination, the grouping unit 268 divides the imaging devices into groups.

A flag adding unit 269 adds the flags to be referred to when a path is generated, to metadata. The flags described below include two kinds of flags: exact flags and fuzzy flags. These two kinds of flags will also be described later.

The path generation unit 270 generates the paths described above with reference to FIGS. 1 through 5, such as the path 91 (FIG. 5). The path generation unit 270 includes a global path generation unit 291, a first local path generation unit 292, and a second local path generation unit 293.

In the description that will be continued below, path generation involves two paths: a global path and a local path. A global path is a path generated as a global path that connects multiple imaging devices, and a local path is a path generated as a local path within an imaging device. There are two methods of generating a local path, and flags are used to determine whether a local path is to be generated by the first local path generation unit 292, or whether a local path is to be generated by the second local path generation unit 293.

An edit file creation unit 294 creates the edit file that contains information about paths. What kinds of information are stored in the edit file will be described later. Depending on the stored information, metadata is referred to, and part of the information written in the metadata is included in the stored information.

A presentation unit 271 performs a process of presenting a generated path (the edit file) to the user. The data of a path may be presented to the user, and an image based on a path may be displayed, and thus, be presented to the user.

A real-time image is cut out in accordance with the edit file, is displayed, and is presented to the user. The image data of the image to be cut out is image data recorded on a recording medium, or image data supplied from another device, such as the server 203, via the network 201. Alternatively, the image data may be image data that is being streamed.

Further, in the description that will be continued below, the edit file is created, data other than an edit file may be created. For example, video content from which an image has been cut out in accordance with a path may be generated. This generated video content may be presented to the user.

An editing unit 272 accepts a path edit instruction from the user, and edits a path. The editing unit 272 is provided so that the user can perform desired editing on a path presented by the presentation unit 271.

<First Process for Still Images>

Referring now to the flowcharts shown in FIGS. 9 through 15, path generation to be performed in the information processing device 204 is described. First, an example case where the images to be processed are still images is described.

Referring first to the flowchart shown in FIG. 9, the flow of the entire processing is described. In step S101, a feature point extraction process is performed. The image data acquisition unit 261 of the information processing device 204 acquires image data supplied from the imaging device 202-1 or from the imaging device 202-2 via the server 203. At this point, the metadata acquisition unit 263 of the information processing device 204 also acquires the metadata accompanying the image data.

The feature point extraction process to be performed in step S101 will be described later with reference to the flowchart shown in FIG. 10. It should be noted that the feature point extraction process in step S101 may be performed on the side of the server 203, and may not be performed as a process on the side of the information processing device 204. Also, the result of a feature point extraction process performed in another device may be recorded on a recording medium or the like, and the recording medium or the like may be distributed. In this manner, the information processing device 204 can acquire feature point information, and the process in step S101 can be omitted from the process flow.

After feature points are extracted in step S101, the path generation unit 270 in step S102 generates a path that connects the feature points. The path generation process to be performed in step S102 will be described later with reference to the flowchart shown in FIG. 11.

After a path is generated in step S102, the presentation unit 271 in step S103 presents the path to the user so that the user can check whether the generated path is acceptable. In step S104, if the user wishes to edit the path as a result of the presentation of the path to the user, the editing unit 272 accepts editing of the path, and then edits the path.

As described above, a path that connects characteristic portions in images is generated without troubling the user, and images based on the path are displayed. Thus, the user can successively view interesting portions from images. Also, the generated path is presented to the user so that the user can edit the path. Thus, a path to the user's liking can be formed.

It should be noted that, in a case where a path has been edited by the user, the result of the editing may be fed back to the path generation unit 270. The path generation unit 270 may have a learning function that learns edited portions and the like so that a path desired by the user can be more accurately generated.

Referring now to the flowchart shown in FIG. 10, the feature point extraction process to be performed in step S101 is described.

In step S111, feature points are extracted. As described above with reference to FIG. 1, the feature point extraction unit 262 detects portions with many people from images, for example.

In step S130, a score is calculated for each imaging device. This step is carried out on the assumption that images taken with imaging devices have been acquired, and feature points have been extracted from the respective images. A score may be the number of feature points extracted from one image (or one imaging device). Alternatively, a score is calculated for each feature point, and the total of the scores of the feature points of one image (or one imaging device) may be calculated as the score of the imaging device. An example case where a total of scores is calculated as a score is described herein.

Figure 16:
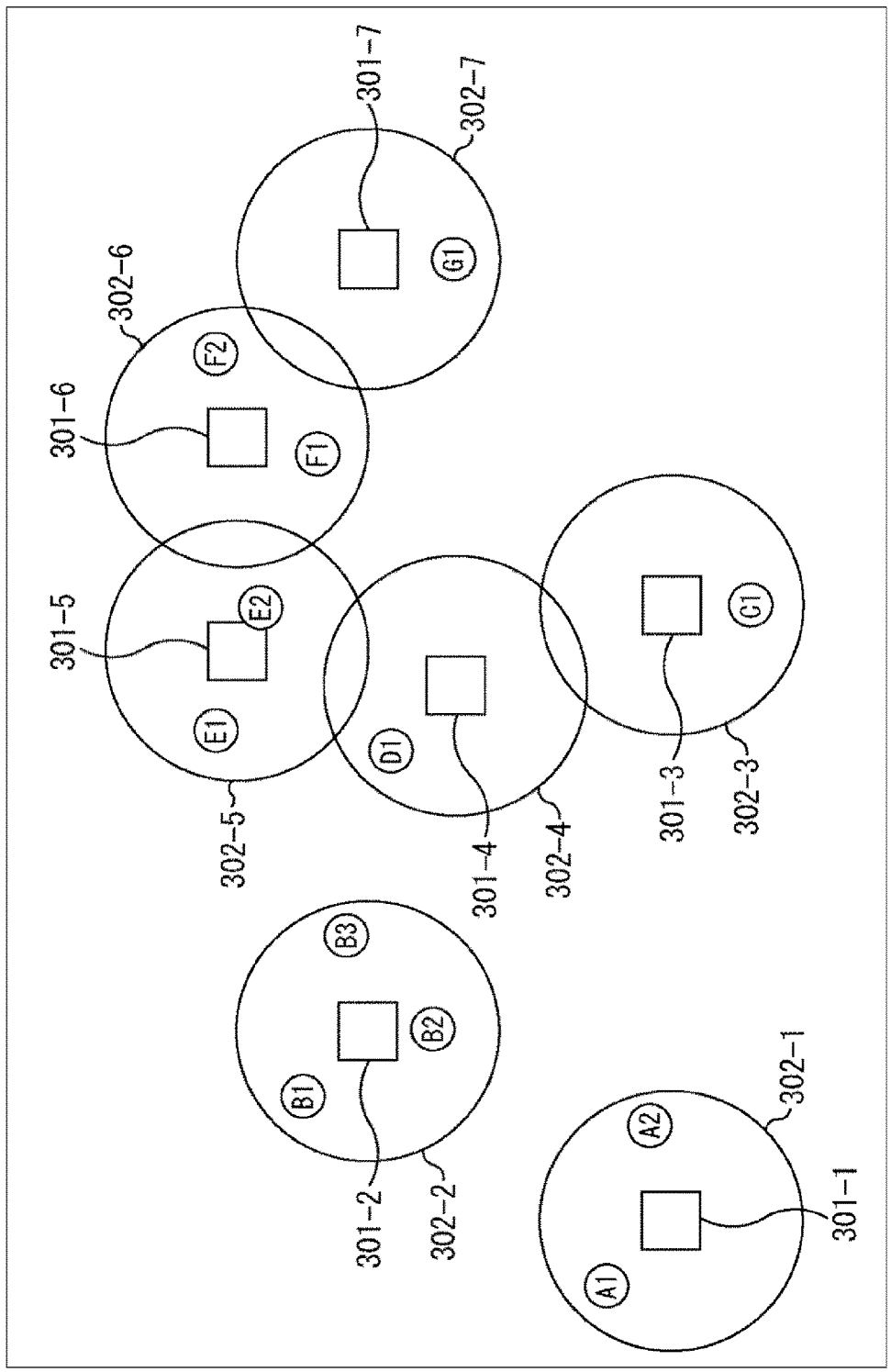
FIG. 16 is a diagram for explaining groups.

For example, there is a situation like the one shown in FIG. 16. Like the situation shown in FIG. 5, the situation shown in FIG. 16 is a situation where imaging devices 301 are installed in predetermined positions. In the example situation shown in FIG. 16, seven imaging devices, or imaging devices 301-1 through 301-7, are installed. The imaging ranges of the respective imaging devices 301 are ranges 302-1 through 302-7, and are represented by circles in FIG. 16.

Each imaging device 301 may be an imaging device that can exchange data directly with the information processing device 204, like the imaging device 202-1 shown in FIG. 6. Each imaging device 301 may be an imaging device that can exchange data indirectly with the information processing device 204 via the server 203, like the imaging device 202-2.

The imaging devices 301 are arranged as shown in FIG. 16. The imaging devices 301-3 through 301-7 have imaging ranges 302 overlapping the imaging range 302 of one another. However, the imaging device 301-1 and the imaging device 301-2 are arranged so that the imaging ranges 302 of the imaging devices 301-1 and 301-2 do not overlap the imaging range 302 of any other imaging device 301.

In such a situation, a feature point A1 and a feature point A2 are detected from an image taken with the imaging device 301-1. Likewise, a feature point B1, a feature point B2, and a feature point B3 are detected from an image taken with the imaging device 301-2, a feature point C1 is detected from an image taken with the imaging device 301-3, and a feature point D1 is detected from an image taken with the imaging device 301-4.

Also, a feature point E1 and a feature point E2 are detected from an image taken with the imaging device 301-5, a feature point F1 and a feature point F2 are detected from an image taken with the imaging device 301-6, and a feature point G1 is detected from an image taken with the imaging device 301-7.

The feature points are detected in this manner, and a total of the scores of feature points is calculated for each imaging device 301. As a result, the following order is obtained.

Feature points B1+B2+B3>feature points E1+E2>feature points F1+F2>feature points A1+A2>feature point C1>feature point D1>feature point G1

Where the above order is rewritten in terms of the imaging devices 301, the following order is obtained.

Imaging device 301-2>imaging device 301-5>imaging device 301-6>imaging device 301-1>imaging device 301-3>imaging device 301-4>imaging device 301-7

After the order of the scores of the imaging devices 301 is determined in the above manner, the imaging device extraction unit 267 (FIG. 8) in step S113 extracts M imaging devices 301 with the highest scores. "M" may be set beforehand as a fixed number, or may be a ratio corresponding to the number of the imaging devices 301 whose scores have been calculated, such as a ratio of 80%, and be a number that is variably set. In the description that will be continued below with reference to FIG. 16, M is 5.

In a case where the order of the imaging devices is the above order, the top five imaging devices 301 are the imaging device 301-2, the imaging device 301-5, the imaging device 301-6, the imaging device 301-1, and the imaging device 301-3. In the process described below, the images taken with the imaging devices 301 extracted in step S113 are the current images to be processed. That is, in step S113, the current images (imaging devices 301) to be processed are narrowed down.

Figure 17:
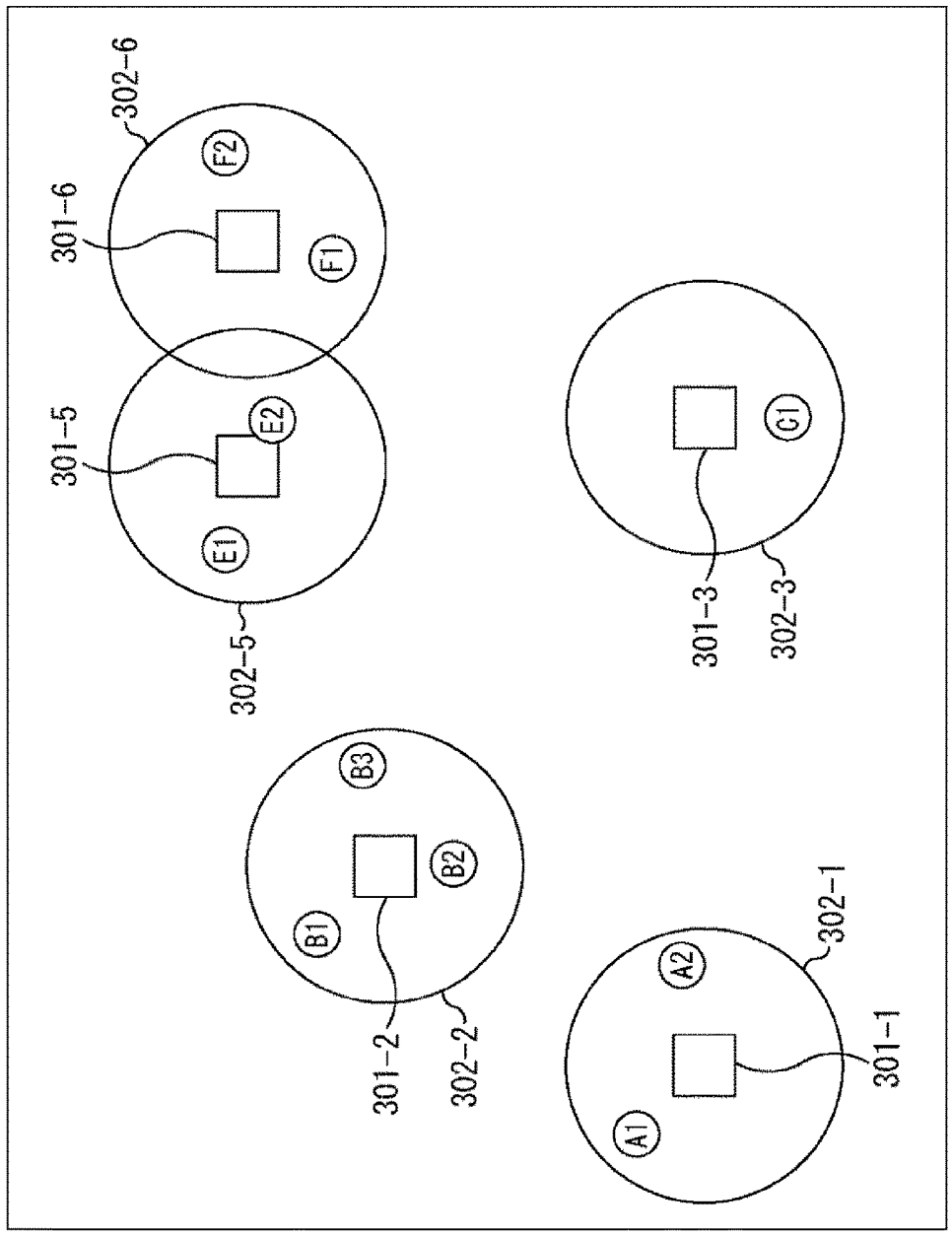
FIG. 17 is a diagram for explaining groups.

FIG. 17 shows the arrangement of the imaging devices 301 after the narrowing down. In the process described below, these five imaging devices 301-1, 301-2, 301-3, 301-5, and 301-6 are the current targets to be processed.

In step S114, information about feature points and the like is added to metadata. The metadata edit unit 265 adds information about the feature points extracted by the feature point extraction unit 262 to the metadata acquired by the metadata acquisition unit 263.

The information shown in FIG. 18, for example, is written in the metadata. The location information about the imaging devices, the angles of view of the imaging devices, the location information about the feature points, the scores of the respective feature points, and the score (total score) are written in metadata 331.

The location information about the imaging devices and the angles of view of the imaging devices are information supplied from the imaging devices 302, and is information included in the metadata acquired by the metadata acquisition unit 263. The location information about the feature points, the scores of the respective feature points, and the score (total score) are the information to be added to the metadata 331 by the metadata edit unit 265.

The metadata 331 described herein is an example, and does not limit the technology. Other information may also be written in the metadata 331, or the score (total score) may not be written in the metadata 331, for example.

It should be noted that, in the example described herein, the information processing device 204 detects feature points, and the information about the feature points is added to the metadata 331. However, in a case where the server 203 (FIG. 6) acquires image data from the imaging devices and detect feature points, for example, the server 203 may generate the metadata shown in FIG. 17, or the metadata 331 in which the information about the feature points is also written.

As described above with reference to the flowchart shown in FIG. 10, the imaging devices as the current targets to be processed at the time of path generation are narrowed down, before a path is generated. As a path is generated after the narrowing down is performed, the processing load at the time of path generation can be reduced.

After the feature point extraction process is performed in step S101 (FIG. 9) as described above with reference to the flowchart shown in FIG. 10, the process moves on to step S102, and the path generation process starts. Referring now to the flowchart shown in FIG. 11, the path generation process to be performed in step S102 is described.

In step S121, the grouping unit 268 divides the imaging devices 310 into groups by referring to the metadata 331 acquired by the metadata acquisition unit 263 or the metadata 331 generated by the metadata edit unit 265.

FIG. 17 is now again referred to. When five imaging devices 301 are the current targets to be processed as shown in FIG. 17, the range 302-1 of the imaging device 301-1, the range 302-2 of the imaging device 301-2, and the range 302-3 of the imaging device 301-3 do not overlap one another, as can be seen from the imaging ranges 302 of the five imaging devices 301. These imaging devices 301 having imaging ranges that do not overlap one another are referred to as isolated groups. It should be noted that, despite the name, one isolated group includes only one imaging device 301.

Meanwhile, the range 302-5 of the imaging device 301-5 and the range 302-6 of the imaging device 301-6 overlap each other. These imaging devices 301 having imaging ranges that overlap each other are referred to as a unified group. That is, a unified group is a group that includes imaging devices with imaging ranges overlapping one another, and the imaging devices isolated from the unified group are isolated groups.

If the seven imaging devices 301 shown in FIG. 16 are the current targets to be processed, the imaging device 301-1 and the imaging device 301-2 belong to respective isolated groups, and the imaging devices 301-3 through 301-7 belong to a unified group.

In step S121, the grouping unit 268 classifies the current imaging devices 301 to be processed into isolated groups and a unified group.

In step S122, the flag adding unit 269 assigns flags to the respective imaging devices 301 as the current targets to be processed. The flags are fuzzy flags or exact flags. Fuzzy flags are flags to be assigned when a path suitable for a scenic walk is generated, for example. Exact flags are flags to be assigned when a path suitable for a virtual art museum or the like is generated, for example.

Figure 19:
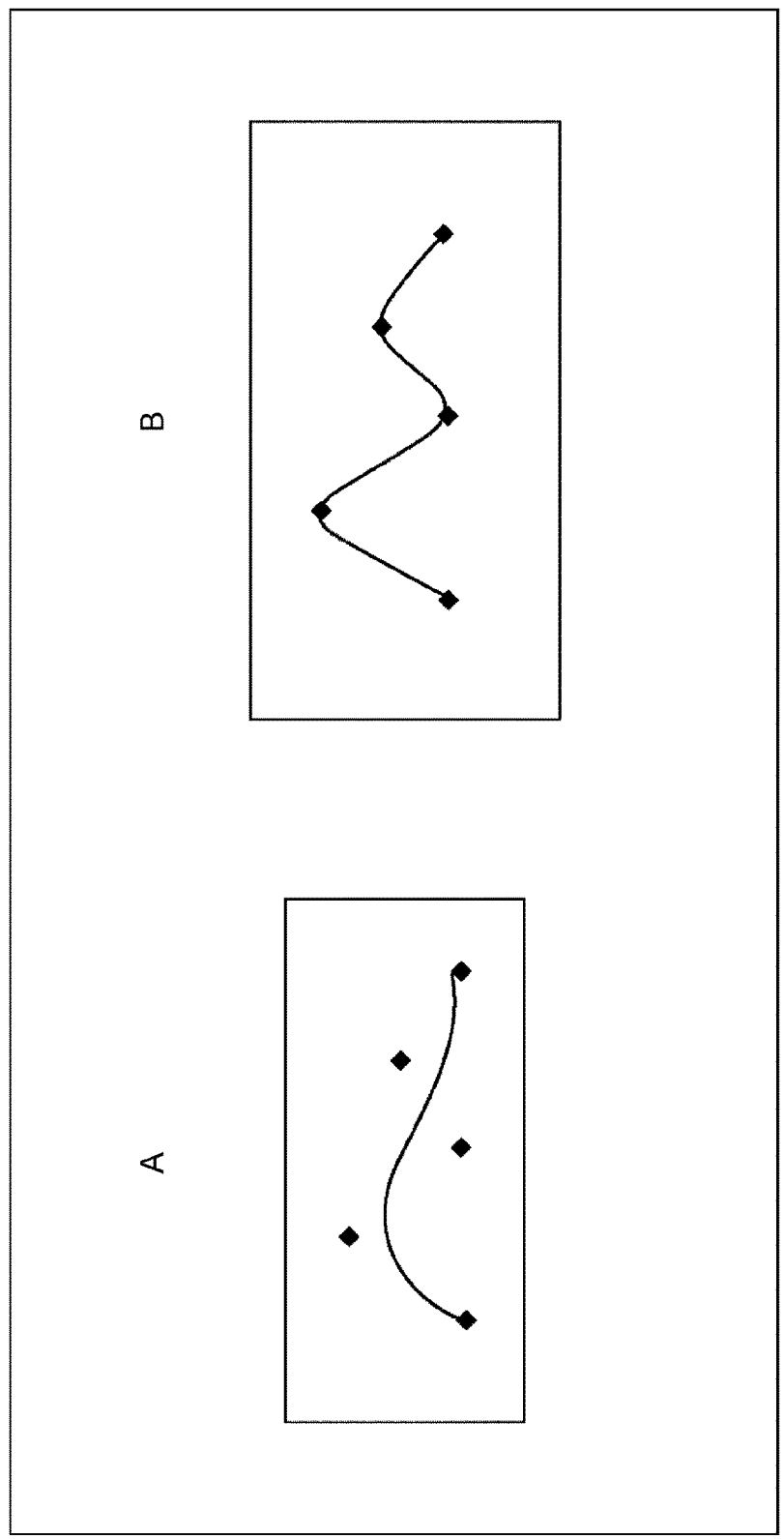
FIG. 19 is a diagram for explaining flags.

A of FIG. 19 is a diagram showing an example of a path to be generated when fuzzy flags are assigned. In A of FIG. 19, the squares represent the locations of feature points, and the curve indicates the path to be generated. As shown in A of FIG. 19, the path is not a path that extends through the feature points, but is a path that extends in the vicinities of the feature points.

In a case where images are displayed in accordance with such a path, images each including a feature point are successively presented to the user. As such images are provided, it is possible to provide the user with the images to be seen when the user is virtually walking along the path. In a case where the images are images of a town, the user can view the images that make him/her feel as if he/she were actually waking in the town.

In view of this, when images having fuzzy flags assigned thereto are to be processed, a path that extends in the vicinities of the feature points is generated.

Meanwhile, a path to be generated when exact flags are assigned is like the path shown in B of FIG. 19. The squares represent the locations of feature points, and the curve indicates the path to be generated, as in A of FIG. 19. As shown in B of FIG. 19, the path is a path that extends through the feature points.

In a case where images are displayed in accordance with such a path, images (portions) each including a feature point are successively presented to the user. For example, in a case where a process has been performed so that the portions showing objects exhibited in an exhibition are extracted as feature points, a path that is generated when exact flags are assigned is a path that extends through the feature points as shown in B of FIG. 19, or a path that extends through the exhibited objects in this case. Thus, images that successively show the user the images of the exhibited objects are formed.

As a result, the user can view images that enable him/her to experience viewing of the exhibited objects while virtually walking in the exhibition site. In view of this, when images having exact flags assigned thereto are to be processed, a path that extends through the feature points is generated.

In step S122, such fuzzy flags or exact flags are assigned to the current images to be processed. The current images to be processed may be analyzed, and which flags are suited may be determined. The flags may be then assigned to the images. Alternatively, the metadata may include the information to be referred to when flags are assigned as the information related to the images, such as information about genres. In accordance with such information, the flags to be assigned may be determined.

Also, the metadata supplied from an imaging device 202 (FIG. 6) may include information indicating that the flags are fuzzy flags, or that the flags are exact flags. In this case, the imaging device 202 assigns the flags, and therefore, the process in step S122 can be omitted from flowchart shown in FIG. 11.

Figure 11:
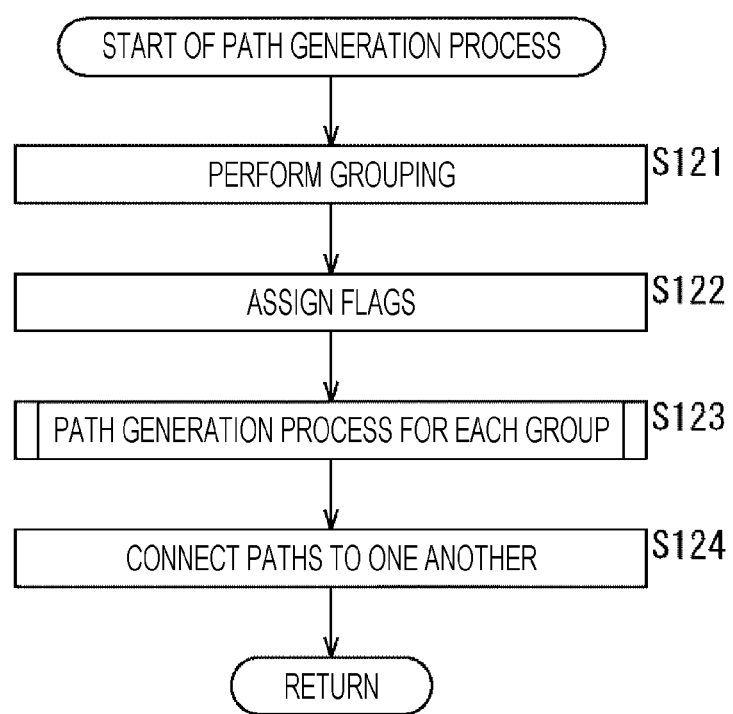
FIG. 11 is a flowchart for explaining the first path generation process for still images.

Referring back to the flowchart shown in FIG. 11, after the flags are assigned in step S122, a path generation process for each group is performed in step S123. Referring now to the flowchart shown in FIG. 12, the path generation process to be performed for each group in step S123 is described.

In step S131, the path generation unit 270 (FIG. 8) sets the current group to be processed. In step S132, a check is made to determine whether the current group is a unified group.

For example, the unified group formed with the imaging device 301-5 and the imaging device 301-6 in the current targets shown in FIG. 17 is set as the current group to be processed in step S131, the current group to be processed is determined to be a unified group in step S132, and the process then moves on to step S133.

In step S133, a global path generation process is performed. A global path is a path that connects the feature points or the imaging devices scattered in a unified group. In the description that will be continued below, a path that connects feature points is to be generated. That is, in step S133, a path (global path) that connects the feature points included in a unified group is generated.

Figure 13:
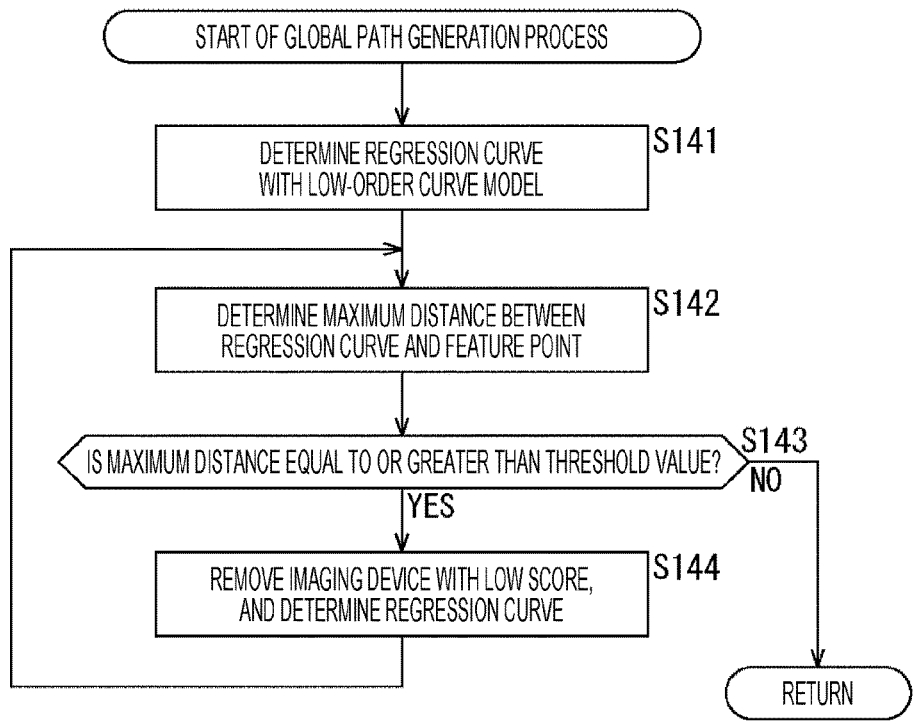
FIG. 13 is a flowchart for explaining the first path generation process for still images.

Referring now to the flowchart shown in FIG. 13, the global path generation process to be performed in step S133 is described.

In step S141, a regression curve is determined in accordance with a low-order curve model. For example, a regression curve is determined by the least-squares method.

FIG. 17 is now again referred to. The location of the feature point A1 in FIG. 17 is represented by A1($x_1$, $y_1$). Likewise, the location of the feature point A2 is represented by A2($x_2$, $y_2$). Likewise, the location of the feature point B1 is represented by B1($x_3$, $y_3$), the location of the feature point B2 is represented by B2($x_4$, $y_4$), and the location of the feature point B3 is represented by B3($x_5$, $y_5$). For ease of explanation, an example case where a regression curve that extends through these five feature points is described herein.

The general expression according to the least-squares method is like the equation (1) shown below. Also, $g_k(x)$ in the equation (1) can be expressed by the equation (2) shown below.

[Mathematical Formula 1]

$$f(x) = \sum_{k=1}^{m} a_k g_k(x) \quad (1)$$

$$g_k(x) = x^{k-1} \quad (2)$$

In the equation (1), m represents the order. Although a regression curve is determined in accordance with a low-order regression curve model in step S141, this regression curve model is the least-squares method in this case, and the order is m in the equation (1). In step S141, a regression curve is determined by the least-squares method, with m being 3, for example.

Equations (3) that are formed by plugging the coordinates of the five feature points A1, A2, B1, B2, and B3 into the equation (1), with m being 3, are shown below.

[Mathematical Formula 2]

$$y_1 = a_1 + a_2 x_1 + a_3 x_1^2$$

$$y_2 = a_1 + a_2 x_2 + a_3 x_2^2$$

$$y_3 = a_1 + a_2 x_3 + a_3 x_3^2$$

$$y_4 = a_1 + a_2 x_4 + a_3 x_4^2$$

$$y_5 = a_1 + a_2 x_5 + a_3 x_5^2 \quad (3)$$

From the five functions shown as the equations (3), a coefficient $a_1$, a coefficient $a_2$, and a coefficient $a_3$ are determined. As the coefficients are determined, the equation (4) shown below is determined to be the regression curve.

[Mathematical Formula 3]

$$y = a_1 + a_2 x + a_3 x^2 \quad (4)$$

In step S141, a regression curve is determined in this manner.

In step S142, the distances between the determined regression curve and the feature points are calculated, and the longest distance among the distances from the respective feature points is determined to be the maximum distance.

In step S143, a check is made to determine whether the determined maximum distance is equal to or greater than a threshold value. If the maximum distance is determined to be equal to or greater than the threshold value in step S143, the process moves on to step S144.

In step S144, the imaging device with the lowest score is removed from the current targets to be processed, and a regression curve is newly determined. It should be noted that, although the single imaging device with the lowest score is removed from the current targets to be processed in the description that will be continued below, two or more imaging devices with low scores may be removed from the current targets to be processed. Alternatively, imaging devices with scores equal to or lower than a predetermined value may be removed from the current targets to be processed.

Figure 20:
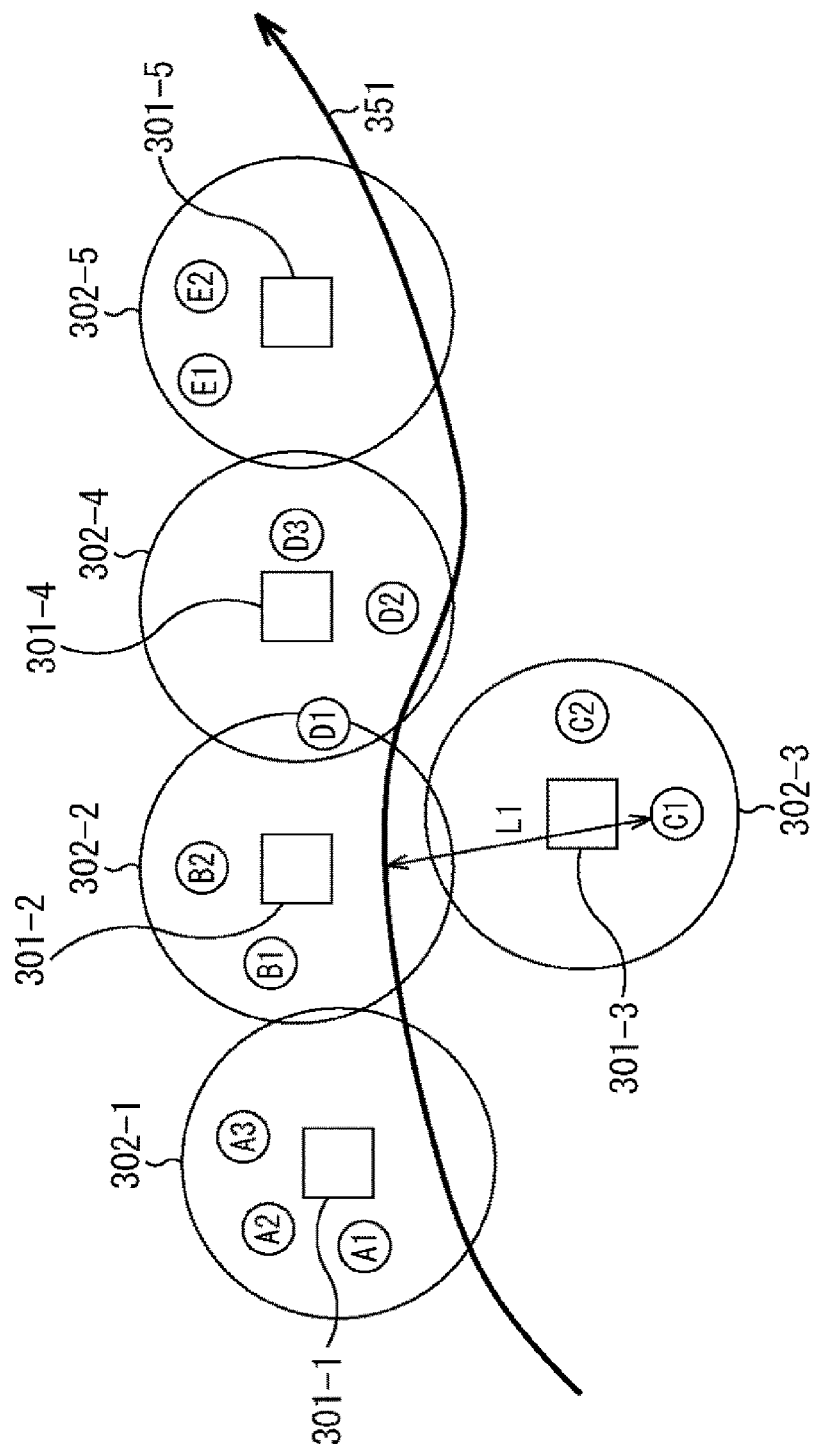
FIG. 20 is a diagram for explaining a path to be generated.
Figure 21:
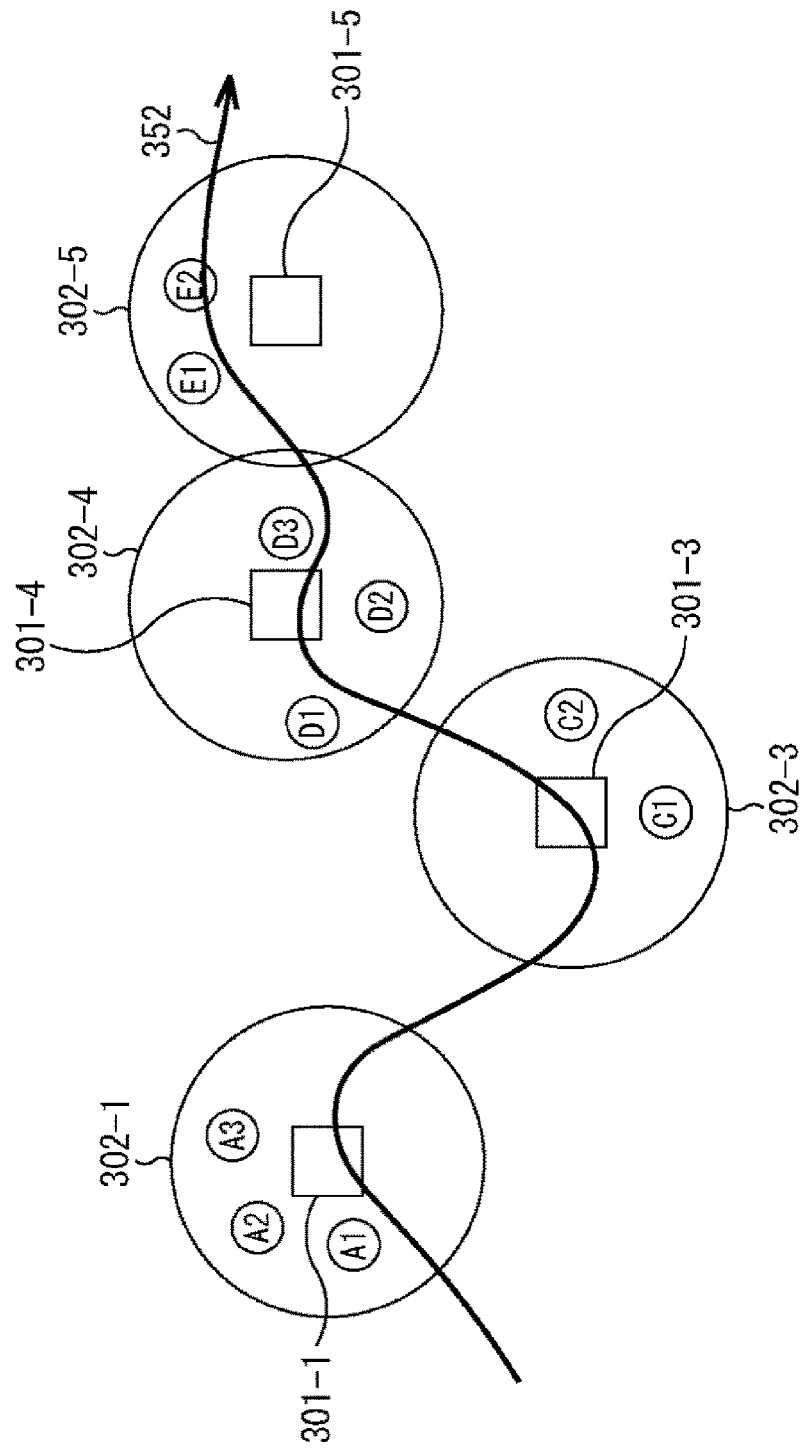
FIG. 21 is a diagram for explaining a path to be generated.

Referring to FIGS. 20 and 21, such a process is described. The situation shown in FIG. 20 is an example case where a regression curve is determined in accordance with a low-order curve model for a unified group formed with five imaging devices 301.

The unified group shown in FIG. 20 is formed with imaging devices 301-1 through 301-5. Feature points A1, A2, and A3 are detected from the imaging range 302-1 of the imaging device 301-1, feature points B1 and B2 are detected from the imaging range 302-2 of the imaging device 301-2, and feature points C1 and C2 are detected from the imaging range 302-3 of the imaging device 301-3.

Further, feature points D1, D2, and D3 are detected from the imaging range 302-4 of the imaging device 301-4, and feature points E1 and E2 are detected from the imaging range 302-5 of the imaging device 301-5.

In step S141, a regression curve is determined from the feature points A1, A2, A3, B1, B2, C1, C2, D1, D2, D3, E1, and E2 detected from images taken with those respective imaging devices 301.

In FIG. 20, the curve indicated by a curved line is a regression curve 351. Since the regression curve 351 is determined in accordance with a low-order curve model, the regression curve 351 is a curve with small changes, having a relatively small number of ups and downs.

In step S142, the distances between the regression curve 651 and the respective feature points are calculated, and the maximum distance is determined. For example, in FIG. 20, the distance between the feature point C1 and the regression curve 351 is a distance L1, and is the maximum distance.

In step S143, a check is made to determine whether the distance L1 is equal to or greater than the threshold value. If the distance L1 is equal to or greater than the threshold value, the process moves on to step S144.

In step S144, an imaging device 301 with a low score is removed from the current targets to be processed, and a regression curve is newly determined. Specifically, in this case, the imaging device 301 with the lowest score (total score) among the imaging devices 301-1 through 301-5 is detected, and is removed from the current targets to be processed.

If the imaging device 301 with a low score is the imaging device 301-2, the imaging device 301-2 is removed from the current targets to be processed. As the imaging device 301-2 is removed from the current targets to be processed, the imaging device 301-1, the imaging device 301-2, the imaging device 301-4, and the imaging device 301-5 are set as the current targets to be processed, and a regression curve is determined from the feature points detected from these four imaging devices 301, as shown in FIG. 21.

In this case, a regression curve 352 is determined as shown in FIG. 21. The regression curve 351 shown in FIG. 20 and the regression curve 352 shown in FIG. 21 are regression curves determined in accordance with the same curve model of the same order.

This process is repeated, and, when the maximum distance is determined not to be equal to or greater than the threshold value in step S143 (FIG. 13), the global path generation process shown in FIG. 13 comes to an end.

According to the flowchart shown in FIG. 13, in a case where the distance between the regression curve and the feature point located furthest from the regression curve is equal to or greater than the predetermined threshold value, the imaging device 301 that has taken the image including the feature point furthest from the regression curve is not removed, but an imaging device 301 with a score is removed.

By virtue of such a process, imaging devices 301 that are at long distances from the regression curve but have high scores are not removed. Accordingly, images that have high feature point scores and are preferably provided to the user can be provided to the user.

It should be noted that, although an imaging device 301 with a low score is removed in the above described case, a feature point with a low score may be removed.

Figure 12:
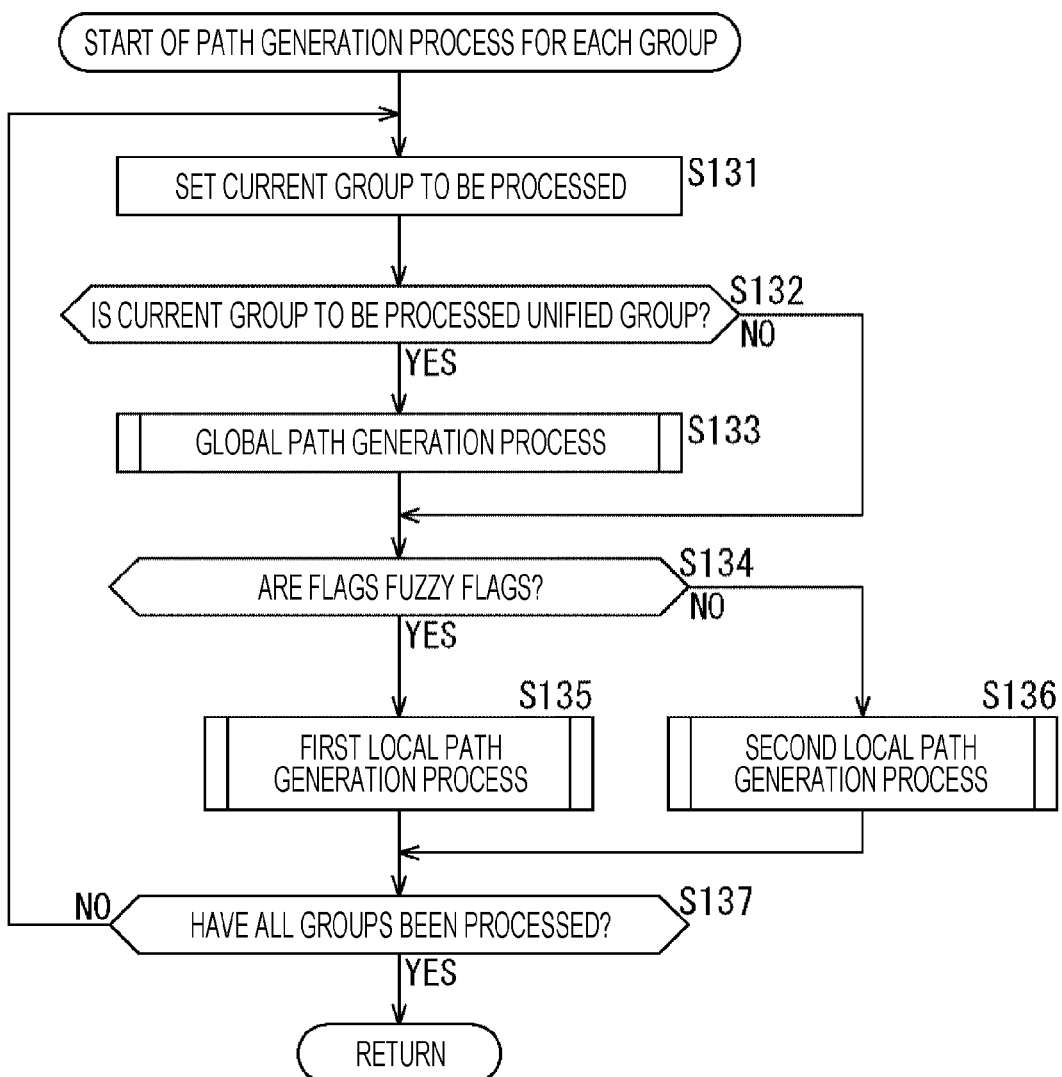
FIG. 12 is a flowchart for explaining the first path generation process for still images.

After a global path is generated in this manner, the process moves on to step S134 (FIG. 12).

Referring back to the flowchart shown in FIG. 12, in step S134, a check is made to determine whether the flags are fuzzy flags.

If the flags are determined to be fuzzy flags in step S134, the process moves on to step S135, and a first local path generation process is performed. Fuzzy flags are passes to be assigned when a path extending in the vicinities of respective feature points is generated. First local path generation is a process for generating such a path.

Figure 14:
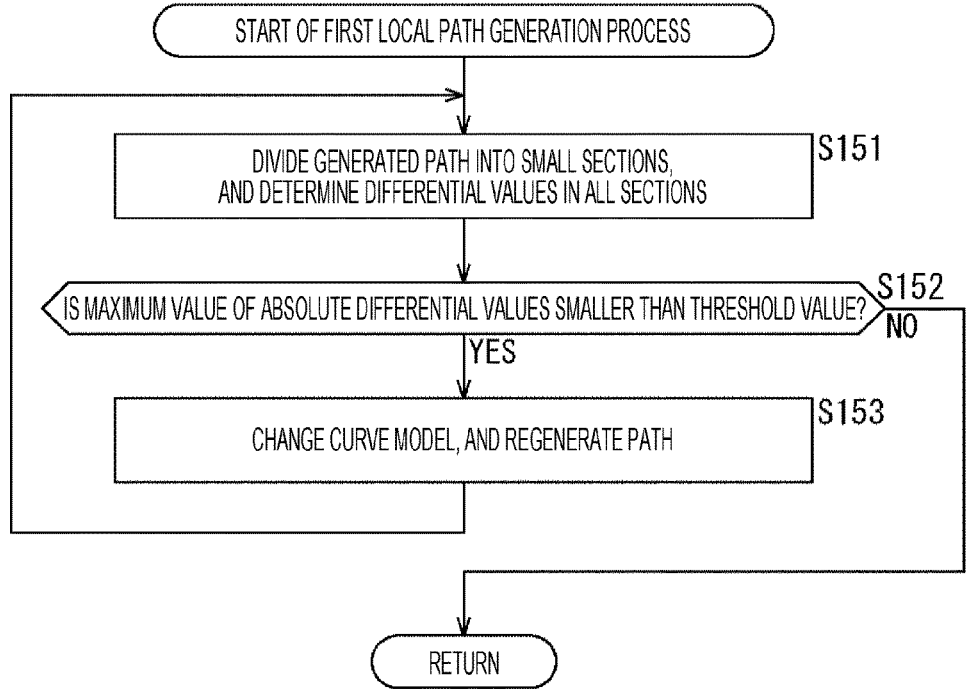
FIG. 14 is a flowchart for explaining the first path generation process for still images.

Referring now to FIG. 14, the first local path generation process to be performed by the first local path generation unit 292 (FIG. 8) in step S135 is described.

Figure 22:
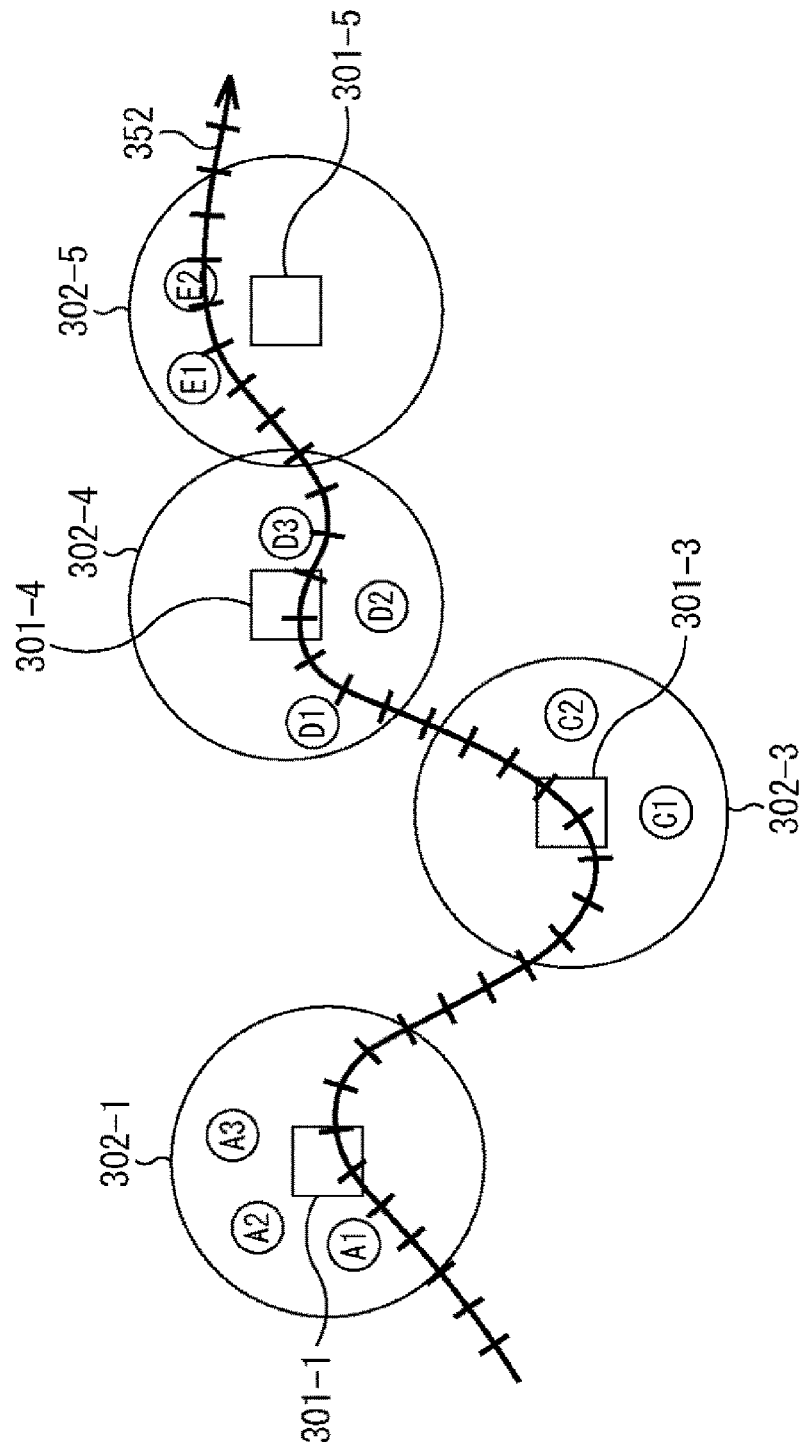
FIG. 22 is a diagram for explaining dividing of a generated path into sections.

In step S151, the generated path is divided into small sections, and differential values are determined in all the sections. As shown in FIG. 22, for example, the regression curve 352, which is the above described global path, is divided into small sections, and a differential value or the slope of the tangent of the regression curve 352 is determined in each section.

It should be noted that, when an isolated group is the current target to be processed, any global path has not generated yet. Therefore, a regression curve is determined before the processing in step S151 is performed. The regression curve in this case is determined in accordance with the low-order curve model used in the processing in step S141 (FIG. 13), for example, with the current targets to be processed being the feature points detected from an image taken with the imaging device 301 forming the isolated group.

After the differential values in the respective sections are determined, a check is made in step S152 to determine whether the maximum value of the absolute differential values is smaller than a threshold value. That is, in step S152, a check is made to determine whether the maximum slope among the slopes in the respective sections is equal to or lower than a predetermined threshold value.

Figure 23:
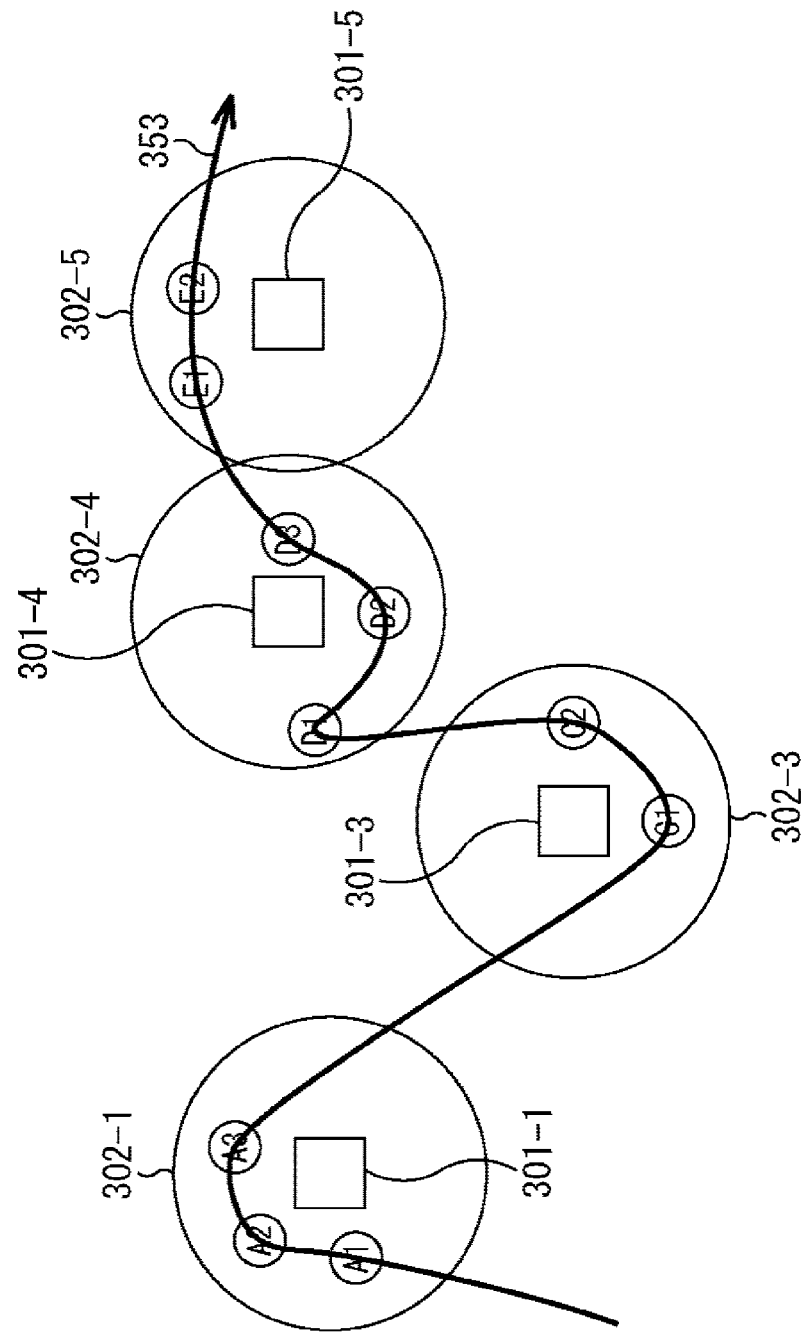
FIG. 23 is a diagram for explaining a path to be generated.

The reason why such a check is made is to prevent generation of the path shown in FIG. 23, for example. When a regression curve is determined from the regression curve 352 as the global path shown in FIG. 22 in accordance with a curve model of a higher order, a regression curve extending through the feature points is generated. FIG. 23 is a diagram showing a regression curve determined in accordance with a curve model of a higher order.

A regression curve 353 is a path that extends through the feature points, but part of the regression curve 353 is steep. In other words, the regression curve 353 has steep slopes. Images having fuzzy flags assigned thereto are images for generating a path to provide the user with images that make him/her feel as if he/she were walking through a town, for example.

In the case of a steep path like the path 353, there is a high possibility that fast-changing images involving rapidly-changing directions are provided to the user, and the images are not preferable. Therefore, to eliminate such steep portions, a check is made in step S152 to determine whether the maximum value of the absolute differential values is smaller than a threshold value.

If the maximum value of the absolute differential values is determined to be smaller than the threshold value in step S152, or if steep slopes are determined to be nonexistent, the process moves on to step S153. In step S153, the curve model is changed, and a path is again generated. For example, a change is made to the order, and a path (a regression curve) is again determined.

Changing the order is to change the order m in the above equation (1) to a greater numerical value, and then determine a regression curve. The above equation (1) is the formula for determining a regression curve in accordance with a low-order curve model in step S141 (FIG. 13). In the above description, a regression curve is determined according to the equation (1) in step S141, with the order m being 3.

A regression curve is again determined, with the order m being greater than 3, or the order m being 5, for example. As the order is made higher, a curve closer to the feature points is generated.

The processes in step S151 and the later steps are then repeated for the redetermined regression curve. Then, if the maximum value of the absolute differential values is determined not to be smaller than the threshold value in step S152, the first local path generation process shown in FIG. 14 comes to an end.

In this manner, a first local path is generated. In step S153, a regression curve is again determined after the order is made higher, for example. In this manner, a regression curve that is closer to the feature points than the pre-change regression curve is generated.

As a regression curve closer to the feature points is generated, there is a possibility that portions with steep slopes are formed. However, as the check in step S152 is made, a regression curve closer to the feature points can be generated without such portions.

In this manner, a path is generated with respect to images having fuzzy flags assigned thereto.

Referring back to the flowchart shown in FIG. 12, if the flags of the current group to be processed are determined not to be fuzzy flags in step S134, or if the flags are determined to be exact flags, the process moves on to step S136.

Exact flags are passes to be assigned when a path extending through the respective feature points is generated. Second local path generation is a process for generating such a path.

Figure 15:
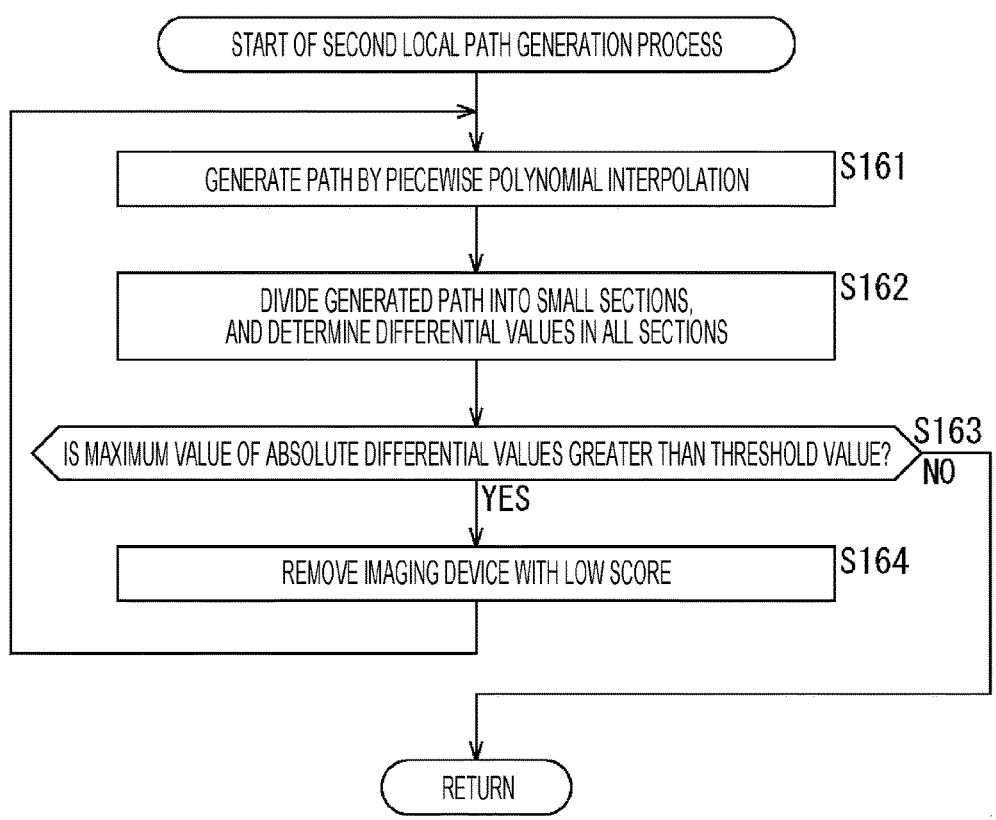
FIG. 15 is a flowchart for explaining the first path generation process for still images.

Referring now to FIG. 15, the second local path generation process to be performed by the second local path generation unit 293 (FIG. 8) in step S136 is described.

In step S161, a path is generated by the least-squares method or piecewise polynomial interpolation. In a case where the current group to be processed is a unified group, a global path (a regression curve) has already been generated, but the global path is a path that extends in the vicinities of the feature points. Therefore, in step S161, the global path is changed to a path that extends through the feature points.

To further change the already generated global path to a path that extends through the feature points, the order of the equation (1) of the least-squares method may be made higher, and a path may be again generated, as in step S153 (FIG. 14). Alternatively, the already generated global path may not be used. Instead, a regression curve may be newly determined by piecewise polynomial interpolation.

In a case where the current group to be processed is an isolated group, a path (a regression curve) is generated in step S161. In this case, any path has not been generated yet, and therefore, a regression curve is determined by piecewise polynomial interpolation.

Piecewise polynomial interpolation is a more suitable method for determining a curve extending through predetermined points (feature points) than the least-squares method. Referring now to FIG. 17, a case where a regression curve is determined according to a piecewise polynomial is described. The location of the feature point A1 in FIG. 17 is represented by A1$(x_1, y_1)$. Likewise, the location of the feature point A2 is represented by A2$(x_2, y_2)$. Likewise, the location of the feature point B1 is represented by B1$(x_3, y_3)$, the location of the feature point B2 is represented by B2$(x_4, y_4)$, and the location of the feature point B3 is represented by B3$(x_5, y_5)$. For ease of explanation, an example case where a regression curve that extends through these five feature points is described herein.

A piecewise polynomial is divided into sections. In this case, the piecewise polynomial is divided into four sections: a first section between A1$(x_1, y_1)$ and A2$(x_2, y_2)$, a second section between A2$(x_2, y_2)$ and B1$(x_3, y_3)$, a third section between B1$(x_3, y_3)$ and B2$(x_4, y_4)$, and a fourth section between B3$(x_4, y_4)$ and B4$(x_5, y_5)$.

In a piecewise polynomial, cubic spline interpolation is normally used. A piecewise polynomial using cubic spline interpolation can be expressed by the equation (5) shown below.

[Mathematical Formula 4]

$$s_j(x) = a_j(x-x_j)^3 + b_j(x-x_j)^2 + c_j(x-x_j) + d_j (j=0,1,2,\ldots N-1) \quad (5)$$

Here, j is a value of 0 to N−1. However, when the above described first through fourth sections are the current targets to be processed, j is a value of 1 to 5. In a case where (N+1) sets of data, or five (=N+1) sets of data (feature points) in this case, are to be handled, the piecewise polynomial is divided into N (=the four of the first through fourth sections) sections.

Accordingly, there are 4N unknowns that are the coefficients in the piecewise polynomial. To determine these unknown numbers, 4N equations are necessary. To determine the coefficients, the conditions specified below are imposed on the cubic spline interpolation.

Condition 1: All the data points are passed through. As the values at both ends of each point are determined, 2N equations are formed.

Condition 2: The respective piecewise interpolants have continuous first derivatives at the boundary points. Because of this, (N−1) equations are formed.

Condition 3: The respective piecewise interpolants also have continuous second derivatives at the boundary points. Because of this, (N−1) equations are formed.

As the above three conditions are imposed, the relationship among the coefficients that are unknowns can be expressed by (4N−2) equations. Since the number of unknowns is 4N, two more equations are required. To make up for this deficiency, another condition is added so that the values of the second derivatives at both ends are set at 0.

A system of equations that satisfies these conditions is solved, and the coefficients $a_j$, $b_j$, $c_j$, and $d_j$ in the equation (5) are determined.

In this manner, a path may be determined according to a piecewise polynomial.

In step S162, the generated path is divided into small sections, and differential values are determined in all the sections. This process can be carried out in a manner similar to that in step S151 (FIG. 14).

In step S163, a check is made to determine whether the maximum value of the absolute differential values is greater than a threshold value. If the maximum value of the absolute differential values is determined to be greater than the threshold value in step S163, the process moves on to step S164.

In step S164, an imaging device with a low score is removed, and the process returns to step S161. The processes in step S161 and the later steps are then carried out.

Referring again to FIG. 23, such a process is described. In a case where the path (regression curve) generated in step S161 is the regression curve 353, this regression curve 353 is divided into small sections in step S162, and differential values are determined in the respective sections.

In step S163, a check is then made to determine whether the maximum value of the absolute differential values is greater than a threshold value. In this case, a check is also made to determine whether there is a steep slope. If it is determined that there is a steep slope, the process moves no to step S164.

In step S164, an imaging device 301 with a low score is removed from the current targets to be processed. The processes in step S161 and the later steps are repeated with the feature points obtained from the imaging devices 301 except for the imaging device(s) 301 removed from the current targets to be processed. In this manner, a path (a regression curve) is generated.

If the maximum value of the absolute differential values is determined not to be greater than the threshold value in step S163, on the other hand, the second local path generation process shown in FIG. 15 comes to an end.

Figure 24:
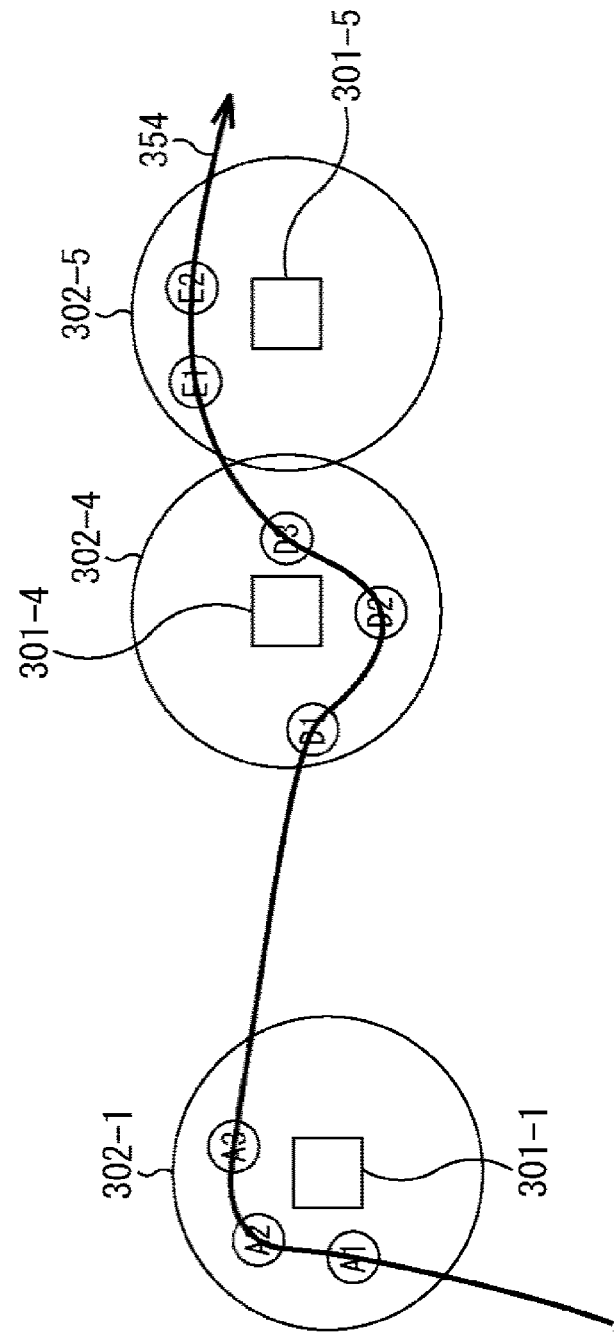
FIG. 24 is a diagram for explaining a path to be generated.

Referring now to FIGS. 23 and 24, the second local path generation is again described. In step S161, the regression curve 353 (path) shown in FIG. 23 is generated, for example. The regression curve 354 is a regression curve that extends through the respective feature points.

In step S162, such a regression curve 353 is divided into small sections, and differential values are determined in the respective sections. In step S163, a check is then made to determine whether the maximum value of the absolute differential values is greater than a threshold value. For example, in the regression curve 353 shown in FIG. 23, the line extending from the feature point C2 to the feature point D1 is a steep slope, and therefore, the maximum value of the absolute differential values is determined to be greater than the threshold value.

In step S164, an imaging device 301 with a low score is removed from the current targets to be processed. In this description that will be continued below, the imaging device 301-3 is removed from the current targets to be processed. As the imaging device 301-3 is removed from the current targets to be processed, the imaging device 301-1, the imaging device 301-4, and the imaging device 301-5 are the current targets to be processed.

In step S161, the feature points A1, A2, A3, D1, D2, D3, E1, and E2 detected from the respective images taken with these three imaging devices 301 are used, and a regression curve is determined by a method such as piecewise polynomial interpolation. In FIG. 24, the regression curve determined in this manner is a regression curve 354.

The processes in steps S161 through S164 are repeated in the above manner until the slopes of the regression curve 354 become relatively gentle. As a path is generated in this manner, a gently sloping path that connects the feature points is generated.

As described above, a gently sloping path is also generated when images having exact flags assigned thereto are processed. Images having exact flags assigned thereto are images for generating a path to provide the user with images that make him/her feel as if he/she were walking through an exhibition site and were viewing the exhibited objects, for example.

In the case of a path having steep portions like the path 353 (FIG. 23), there is a high possibility that fast-changing images involving rapidly-changing directions during a walk are provided to the user, and such images are not preferable. Therefore, to eliminate such steep portions, a check is made in step S163 to determine whether the maximum value of the absolute differential values is greater than a threshold value.

It should be noted that a check may not be made to determine whether the maximum value of the absolute differential values is greater than a threshold value, and a check may be made to determine whether the number of times the sign of the differential is inverted is greater than a threshold value. The number of times the sign of the differential is inverted is the number of times the slope changes from a positive direction to a negative direction or changes from a negative direction to a positive direction. If the number of times the sign of the differential is inverted is large, the path is a greatly winding path. Therefore, to prevent generation of such a path, a check may be made to determine whether the number of times the sign of the differential is inverted is greater than a threshold value.

Referring back to the flowchart shown in FIG. 12, after the second local path generation process is performed, and a path is generated in step S136, the process moves to step S137.

In step S137, a check is made to determine whether all the groups have been processed. If it is determined in step S137 that not all the groups have been processed, the process returns to step S131, and a group that has not been processed yet is newly set as the current group to be processed, and the processes in step S131 and the later steps are repeated.

If it is determined in step S137 that all the groups have been processed, on the other hand, the path generation process for each group shown in FIG. 12 comes to an end. Referring back to the flowchart shown in FIG. 11, after the path generation process for each group in step S123 comes to an end, the process moves on to step S124.

In step S124, a process of connecting paths to one another is performed. Through the processes down to step S123, paths have been generated in the unified group and the isolated groups. A process is performed to generate paths that connect nearby paths to one another among the generated paths.

Figure 25:
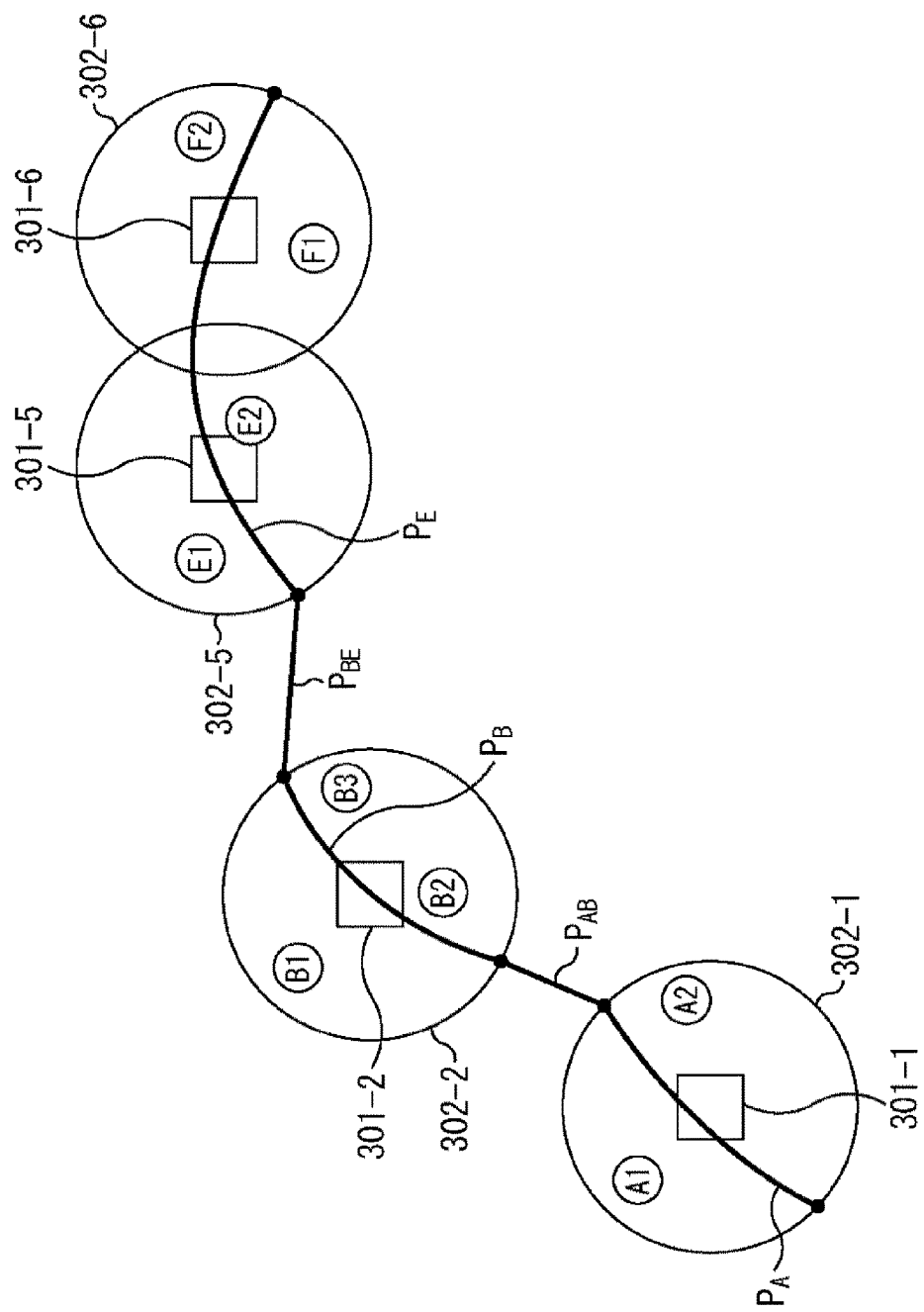
FIG. 25 is a diagram for explaining a path that connects paths.

Referring now to FIG. 25, the process in step S124 is described. In the situation shown in FIG. 25, a path $P_A$ has been generated in the imaging range 302-1 of the imaging device 301-1 of an isolated group, and a path $P_B$ has been generated in the imaging range 302-2 of the imaging device 301-2. Also, a path $P_E$ has been generated in the imaging range 302-5 of the imaging device 301-5 and the imaging range 302-6 of the imaging device 301-6 of a unified group.

Where such paths have been generated, a path $P_{AB}$ that connects the path $P_A$ and the path $P_B$ is generated. Also, a path $P_{BE}$ that connects the path $P_B$ and the path $P_E$ is generated. The path $P_{AB}$ and the path $P_{BE}$ that connect the paths may be set as portions in which transition effects are used. A transition effect is an effect that is used to provide visual effects when scenes are sequentially switched, and a transition effect can be used in moving from one path to another.

In this manner, a path is generated. Information about the generated path is saved as an edit file, for example. The edit file includes information for identifying the imaging devices that have taken the images to be provided to the user (the information being IDs for uniquely identifying the imaging devices, for example), information about the moving direction (the traveling direction in the path), information about the moving speed, and the like.

For example, in a case where images of characteristic areas (characteristic portions) are cut out from a still image, and a path to be presented to the user is generated as described above with reference to FIG. 1, information associated with information about the positions of the cut-outs (such as the coordinates of the point of start of the cutting, and the sizes of the areas), and information about the timing to display the cut-out images (such as the time elapsed since the start of the display, and the display duration time) is written into the edit file.

Also, in a case where images of characteristic areas (characteristic portions) are cut out from still images taken with imaging devices, and a path to be presented to the user is generated as described above with reference to FIG. 5, for example, information associated with information about the positions of the cut-outs and information about the timing to display the cut-out images is written into the edit file, as in the above described case.

In a case where the imaging devices that have taken the images need to be identified, information for uniquely identifying the imaging devices is also written as the information about the positions of the cut-outs into the edit file. In a case where images taken with imaging devices that take images at predetermined intervals are set as the current targets to be processed, for example, information about the imaging times may also be written into the edit file so that the times at which the images were taken are identified. Although information for identifying the imaging devices and information about the imaging times are written in this case, any information that can uniquely identify images can be written into the edit file.

The above described information that is associated with unedited images and is designed to sequentially display images located in a path is written in the edit file.

It should be noted that, although the information about the generated path is stored as the edit file in the above described case, information about a generated path may be stored as video content including image data.

In the edit file, image data may be stored in the order of presentation to the user.

When images are provided to the user, image data is obtained from imaging devices or is read from a predetermined recording medium in accordance with the information included in the edit file. Images based on the obtained image data are then presented to the user.

<Second Process for Still Images>

Next, another method of generating a path for still images is described. In the above described first process for still images, the feature point extraction process is performed in step S101 (FIG. 9), so that the imaging devices as the current targets to be processed are narrowed down.

Figure 26:
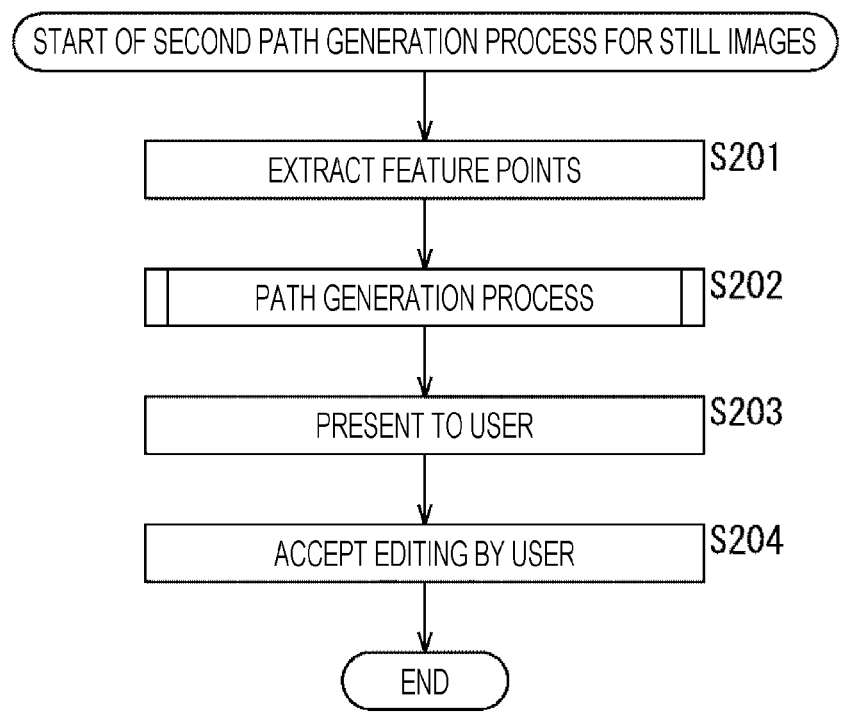
FIG. 26 is a flowchart for explaining a second path generation process for still images.

In a second process for still images, the imaging devices as the current targets to be processed are not narrowed down, and a path is generated. FIG. 26 is a flowchart for explaining the second process for still images.

In step S201, a feature point extraction process is performed. This process can be performed in a manner similar to that in step S111 (FIG. 10) of the first process for still images, and therefore, explanation thereof is not repeated herein.

After feature points are extracted, the process moves on to step S202, and a path generation process is performed. The processes in step S202 and the later steps can be performed in a manner similar to that in the first process for still images, and therefore, explanation thereof is not repeated herein.

In this manner, a path can be generated, even though the imaging devices as the current targets to be processed are not narrowed down. Also, even though the imaging devices are not narrowed down before path generation is started, a process of removing the imaging devices that have taken characterless portions (images) is performed at the time of a global path generation process or at the time of a local path generation process, for example. Thus, the imaging devices are appropriately narrowed down.

A path may also be generated in such a manner.

<Description of Processes for Moving Images>

In the above described embodiment, example cases where still images are processed have been described. As the present technology can also be applied to moving images, cases where moving images are processed will be additionally described below.

Referring now to FIGS. 27 through 30, paths to be generated when moving images are the current targets to be processed are described. In the example cases described below, imaging devices 401-1 through 401-6 take moving images, feature points are extracted from the respective moving images, and a path that extends through the extracted feature points is generated.

It should be noted that, in the drawings and examples described below, there is one feature point extracted from each period, for ease of explanation. However, multiple feature points are extracted from one period in some cases, and the present technology can also be applied in such cases.

Figure 27:
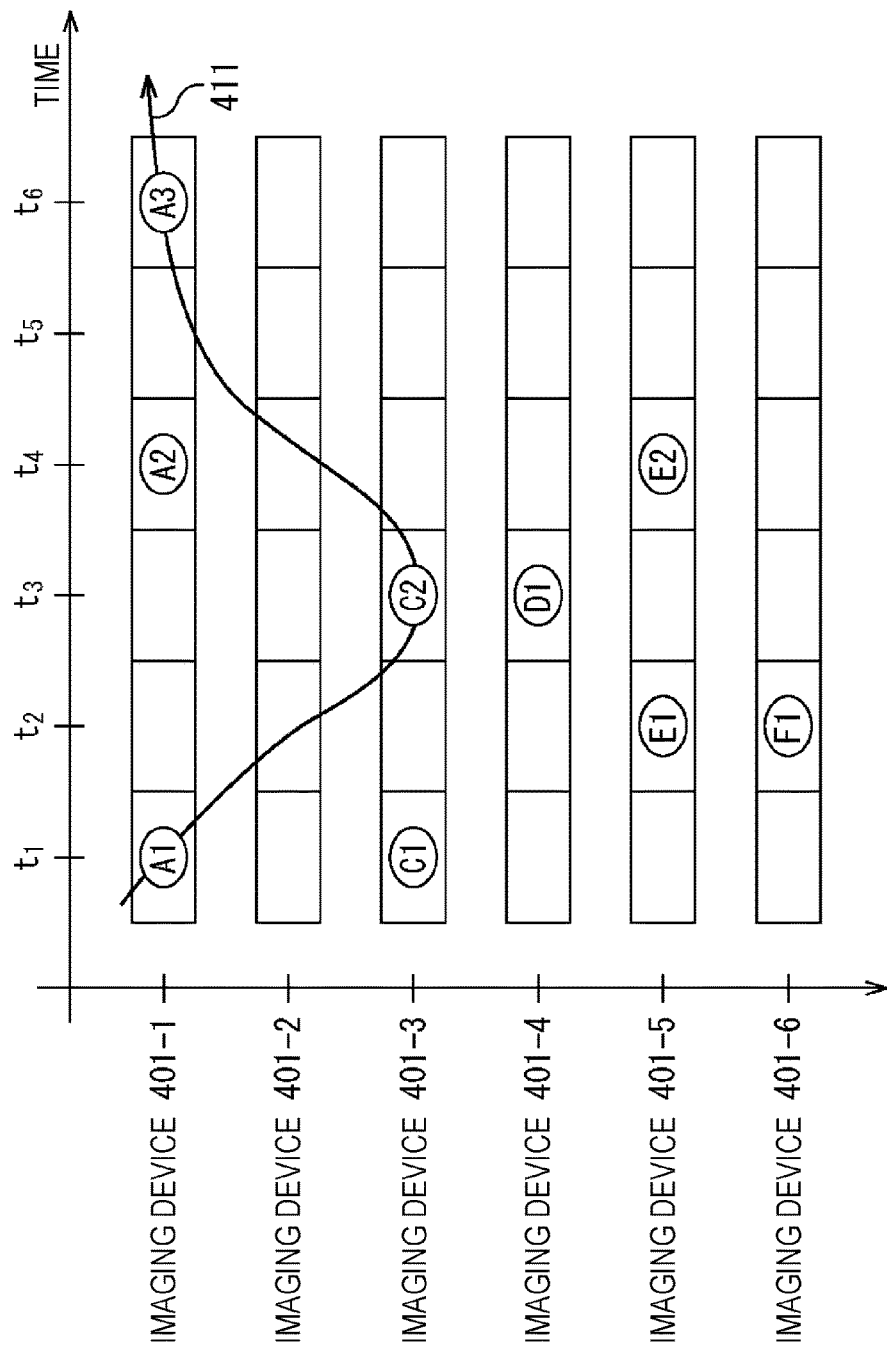
FIG. 27 is a diagram for explaining moving image path generation.

In FIG. 27, the ordinate axis indicates the arrangement of the imaging devices 401-1 through 401-6, and the imaging devices 401-1 through 401-6 are arranged in this order. The abscissa axis indicates periods. In the drawing, a rectangle represents a moving image in a predetermined period, such as one frame or a few frames.

The situation shown in FIG. 27 is a situation where, in a period t1, a feature point A1 has been extracted from a moving image taken with the imaging device 401-1, and a feature point C1 has been extracted from a moving image taken with the imaging device 401-3. Also, in a period t2 in this situation, a feature point E1 has been extracted from a moving image taken with the imaging device 401-5, and a feature point F1 has been extracted from a moving image taken with the imaging device 401-6.

Also, in a period t3 in this situation, a feature point C2 has been extracted from a moving image taken with the imaging device 401-3, and a feature point D1 has been extracted from a moving image taken with the imaging device 401-4. Also, in a period t4 in this situation, a feature point A2 has been extracted from a moving image taken with the imaging device 401-1, and a feature point E2 has been extracted from a moving image taken with the imaging device 401-5. Also, in a period t6 in this situation, a feature point A3 has been extracted from a moving image taken with the imaging device 401-1.

After the feature points have been extracted in this manner, a path 411 that connects the feature point A1, the feature point C2, and the feature point A3 is generated, for example. In a case where a path is generated when moving images are the current targets, a path that is basically irreversible in terms of time is generated. However, for a scene that should be particularly presented to the user, a path is generated so that images taken in the same period are presented to the user in a backward direction in terms of time, or the images are presented to the user as if they were a replay, as will be described later.

In the situation shown in FIG. 27, the path 411 is generated so that the images are not presented in a backward direction in terms of time. Therefore, such a path that returns from the feature point C2 extracted from an image taken in the period t3 to the feature point E1 extracted from an image taken in the period t2 is not generated, for example.

Also, a path should be a gently sloping path as in a case where still images are the current targets to be processed. In the example shown in FIG. 27, the path 411 extending through the feature point A1 and the feature point C2 is generated. However, the path 411 is not a path that connects the feature point A1 directly to the feature point C2, but is a path that extends through the image taken with the imaging device 401-2 in the period t2. Since the imaging device 401-1, the imaging device 401-2, and the imaging device 401-3 are arranged in this order, there is a high possibility that the images taken with these imaging devices also have links with one another.

In view of this, a path that extends from an image taken with the imaging device 401-1 to an image taken with the imaging device 401-2 and then to an image taken with the imaging device 401-3 is generated. In this manner, a path that switches images taken with the imaging devices 401 as if panning were being performed is generated.

Figure 28:
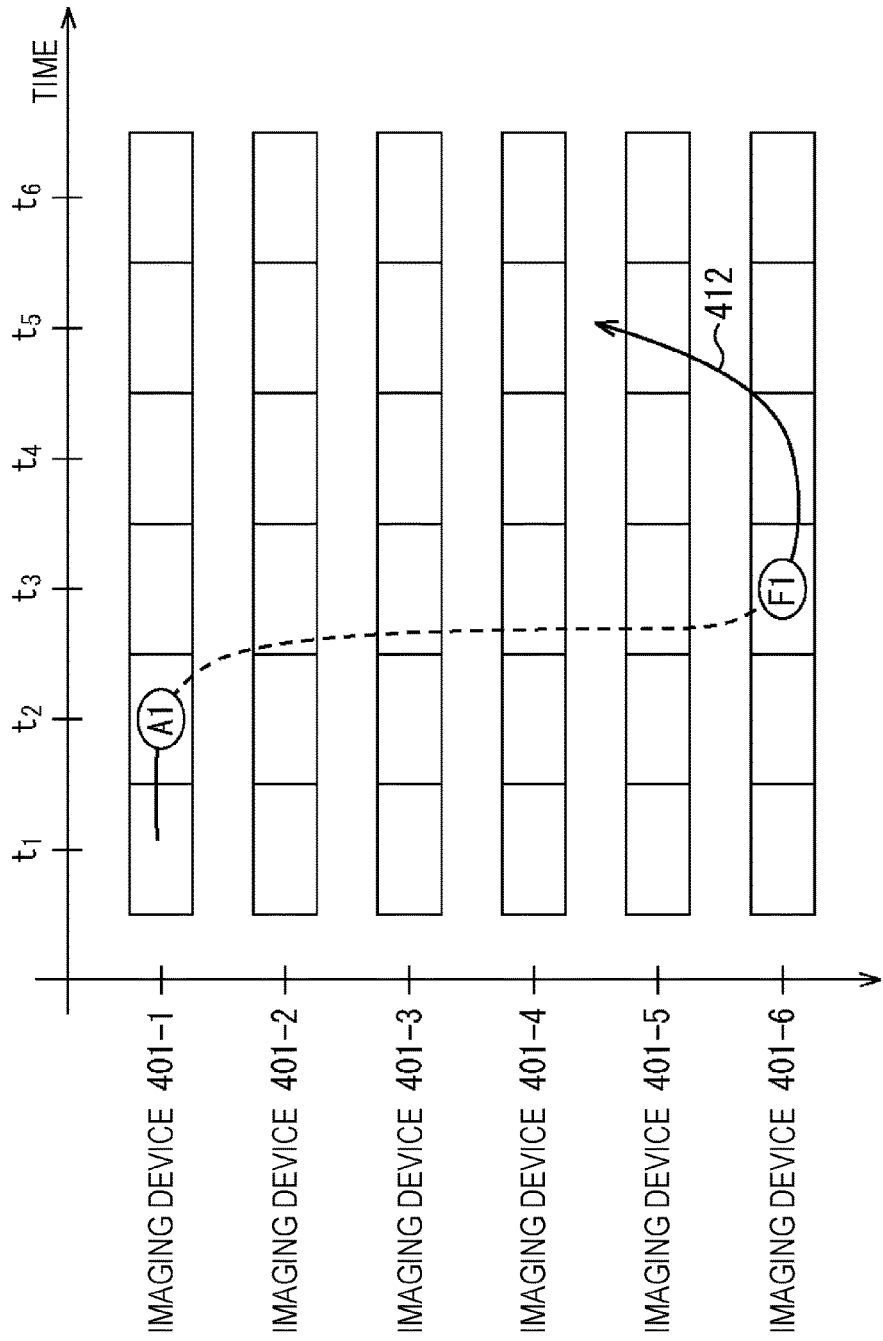
FIG. 28 is a diagram for explaining moving image path generation.

Referring now to FIG. 28, another example of a path to be generated is described. The example shown in FIG. 28 is a situation where, in the period t2, a feature point A1 has been extracted from a moving image taken with the imaging device 401-1, and a feature point F1 has been extracted from a moving image taken with the imaging device 401-6.

In a case where a path 412 that connects the feature point A1 and the feature point F1 is generated, if the feature point A1 and the feature point F1 are connected directly to each other, the images might not be smoothly connected to each other, since the imaging device 401-1 and the imaging device 401-6 are located at a long distance from each other. In such a case, images may be switched by fade-in and fade-out editing techniques.

In FIG. 28, a dashed line indicates the path that switches image by the fade-in and fade-out editing techniques. Thus, in a case where a path that connects images taken in a short time with imaging devices 401 located at a long distance from each other is generated, a path that connects the images by the fade-in and fade-out editing techniques may be generated.

Figure 29:
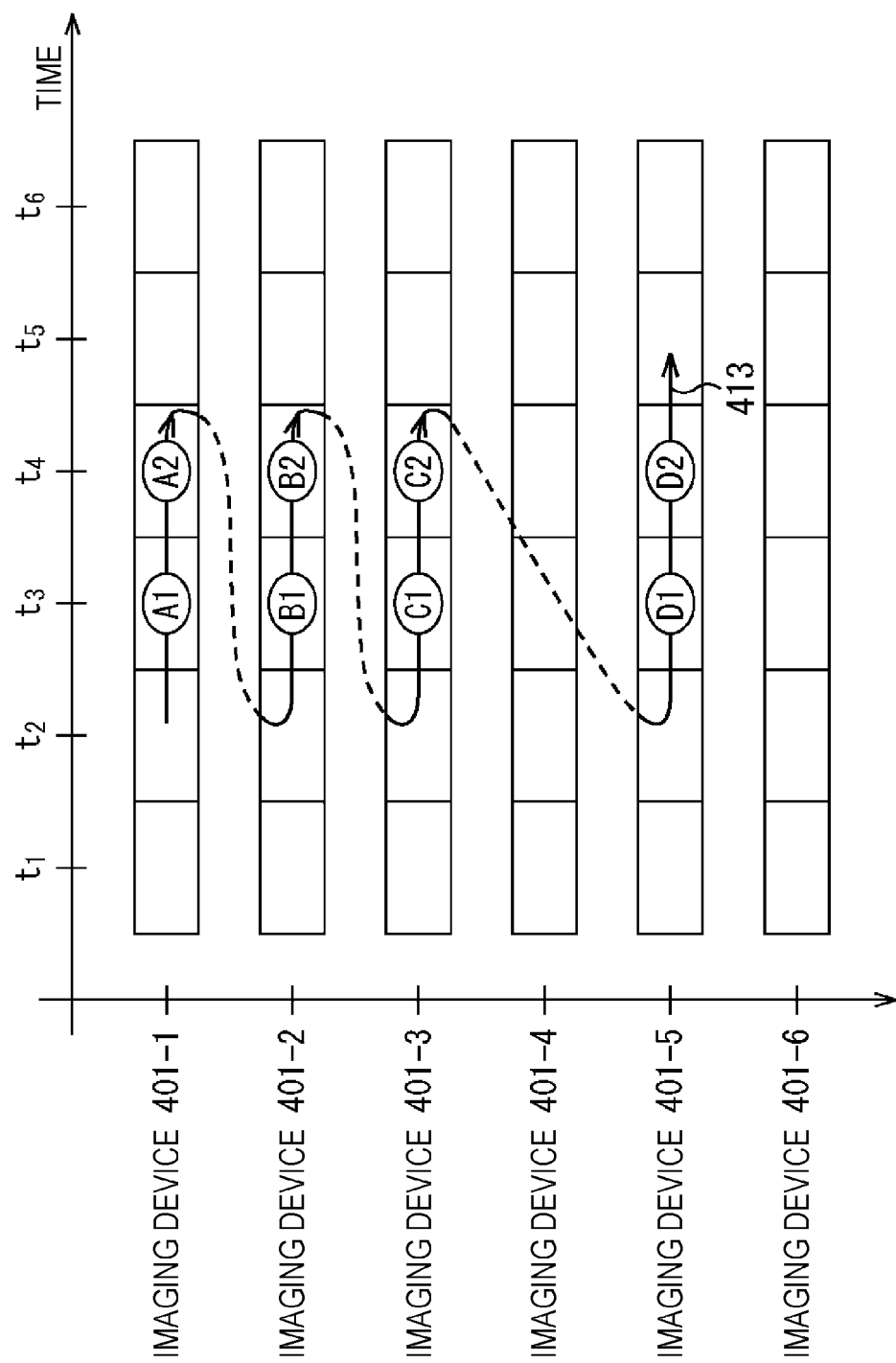
FIG. 29 is a diagram for explaining moving image path generation.

Referring now to FIG. 29, another example of a path to be generated is described. The example shown in FIG. 29 is a situation where, in the period t3, a feature point A1 has been extracted from a moving image taken with the imaging device 401-1, a feature point B1 has been extracted from a moving image taken with the imaging device 401-2, a feature point C1 has been extracted from a moving image taken with the imaging device 401-3, and a feature point D1 has been extracted from a moving image taken with the imaging device 401-5.

Also, in the period t4 in this situation, a feature point A2 has been extracted from a moving image taken with the imaging device 401-1, a feature point B2 has been extracted from a moving image taken with the imaging device 401-2, a feature point C2 has been extracted from a moving image taken with the imaging device 401-3, and a feature point D2 has been extracted from a moving image taken with the imaging device 401-5.

The situation shown in FIG. 29 is a situation where feature points have been extracted with imaging devices 401 in the short time of the period t3 and the period t4. For example, in a case where moving images of a soccer match are being processed, feature points with high scores may be extracted from respective images taken with the imaging devices 401 in a goal-scoring scene or the like.

A scene in which a large number of feature points are extracted with the imaging devices 401 in such a short time can be determined to be a scene suitable for presentation to the user. Therefore, such a path that extends backward in terms of time and provides the user with several images taken at the same time is generated. As such a path is generated, images of a goal-scoring scene taken from different directions can be provided to the user, for example.

In the example shown in FIG. 29, a path 413 that connects the feature point A1, the feature point A2, the feature point B1, the feature point B2, the feature point C1, the feature point C2, the feature point D1, and the feature point D2 is generated. When images taken with different imaging devices 401 are switched from one image to another, a path that does not smoothly connect the images but switches the images is generated. For example, the path 413 that switches from the image of the feature point A2 to the image of the feature point B1 is generated.

By virtue of such a path 413, after the image of the feature point A1 and the image of the feature point A2, which have been taken with the imaging device 401-1, are provided to the user, the image of the feature point B1 and the image of the feature point B2 taken from another direction in the same period are presented to the user. In this manner, such a path that the same scene is repeatedly displayed is generated.

It should be noted that the effect to repeatedly display a scene captured with different imaging devices 401 in the same period as shown in FIG. 29, or a scene captured from different angles, is herein referred to as multi-angle single-scene display.

Figure 30:
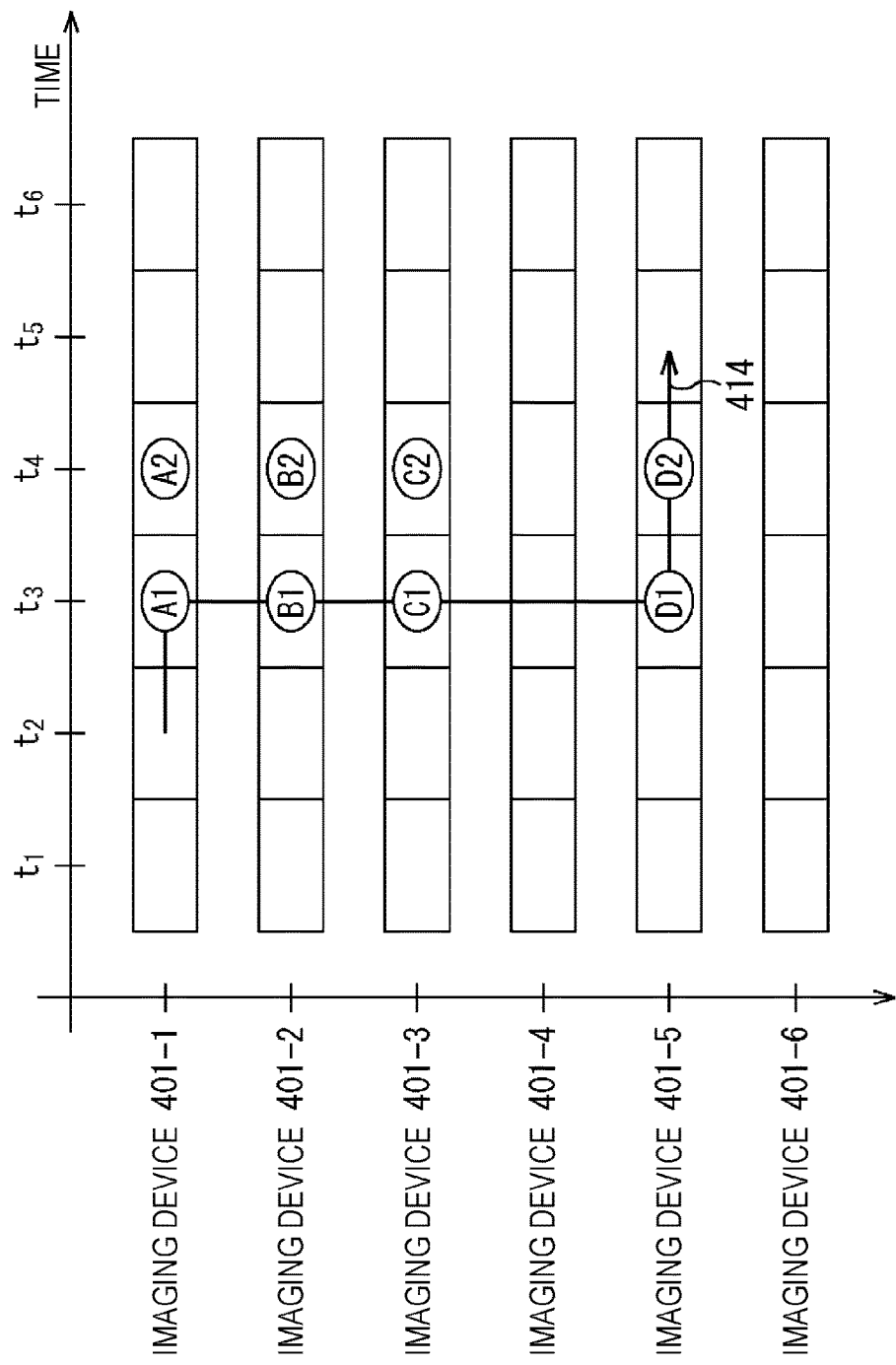
FIG. 30 is a diagram for explaining moving image path generation.

Referring now to FIG. 30, another example of a path to be generated is described. The situation shown in FIG. 30 is the situation shown in FIG. 29. As described above with reference to FIG. 29, the path 413 for multi-angle single-scene display may be generated. Alternatively, as will be described below with reference to FIG. 30, a path 414 that gives a visual effect such as a time-slice (bullet-time) effect may be generated.

In the example shown in FIG. 30, the path 414 that connects the feature point A1, the feature point B1, the feature point C1, and the feature point D1, which have been extracted from images taken in the period t3, is generated. For example, images are switched from the feature point A1 to the feature point B1, a visual effect such as slow motion is used in switching the images.

To achieve a visual effect such as a time-slice effect, the path 414 extends through the image taken with the imaging device 401-4 in the period t3, though any feature point has not been extracted from the image. Such a path 414 is a path that provides the user with a characteristic scene, such as a goal-scoring scene, by sequentially switching images taken from various angles.

It should be noted that, in a case where the path 414 that gives a visual effect such as a time-slice effect as described above with reference to FIG. 30, if one period is formed with multiple frames, display of images taken with different imaging devices is performed while a scene taken from different angles in the same period is repeatedly displayed as described above with reference to FIG. 29.

Specifically, after the multiple frames captured with the imaging device 401-1 in the period t3 are displayed, the multiple frames captured with the imaging device 401-2 in the period t3 are displayed, and the multiple frames captured with the imaging device 401-3 in the period t3 are then displayed. Such display is similar to the multi-angle single-scene display described above with reference to FIG. 29. Therefore, in the case of time-slice, a condition that one period is formed with one frame may be added.

<First Process for Moving Images>

Figure 31:
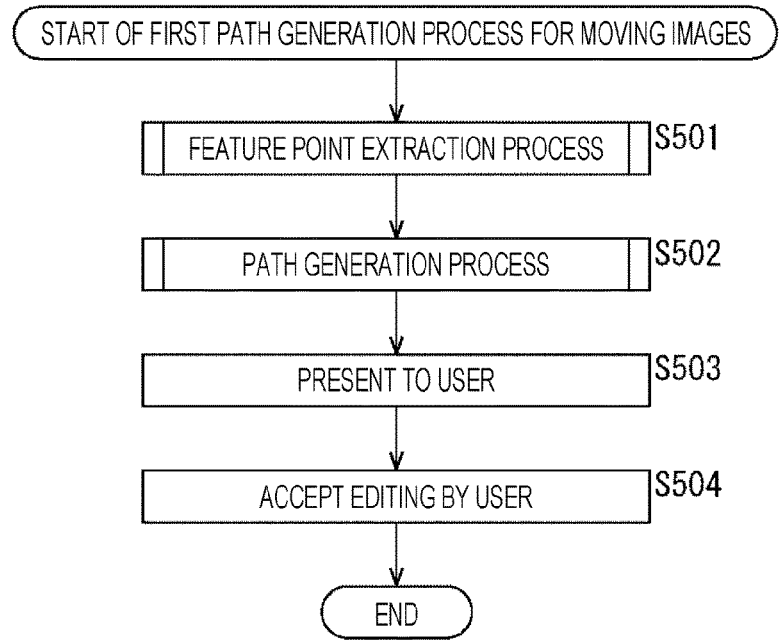
FIG. 31 is a flowchart for explaining a first path generation process for moving images.

Operations of the information processing device 204 (FIG. 7) that generates a path as described above are now described. Referring first to the flowchart shown in FIG. 31, an operation of the information processing device 204 is described as a first path generation process for moving images.

Figure 32:
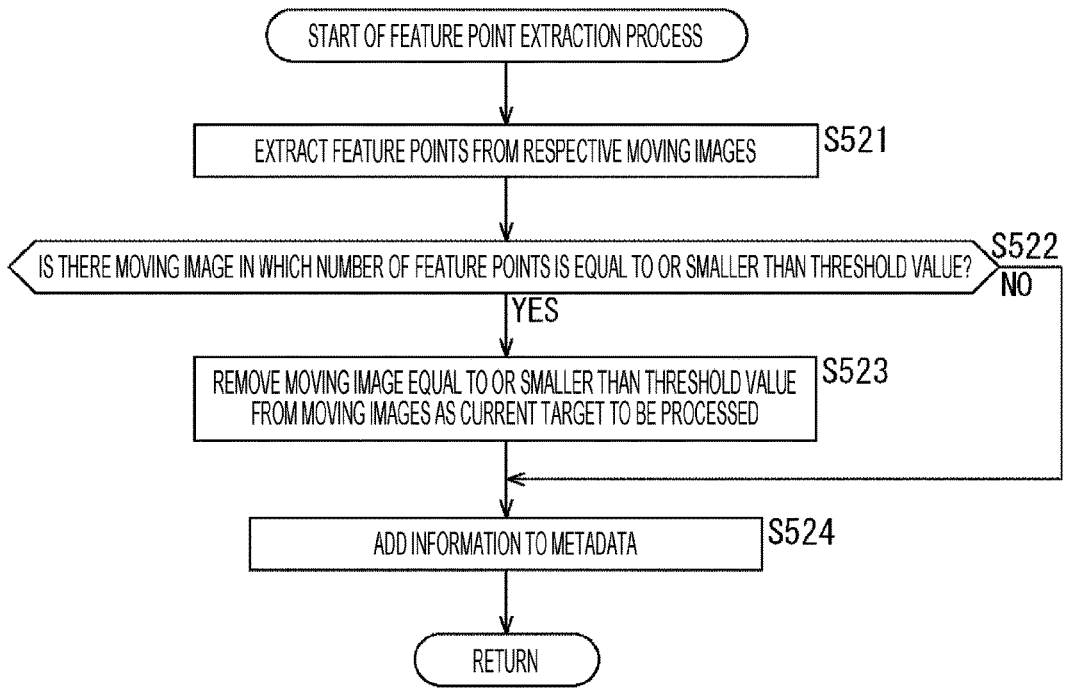
FIG. 32 is a flowchart for explaining the first path generation process for moving images.

In step S501, a feature point extraction process is performed. Referring now to the flowchart shown in FIG. 32, the feature point extraction process to be performed in step S501 is described.

In step S521, feature points are detected from respective moving images. Referring again to FIG. 27, image analysis is conducted on the images taken with the imaging device 401-1, for example, so that the feature point A1, the feature point A2, and the feature point A3 are extracted. Image analysis is also conducted on the images taken with the respective imaging devices 401-2 through 401-6, so that feature points are extracted from the respective images.

In the case of moving images, a certain frame or the frames in a certain period may be extracted. In a case where a certain frame is extracted, information from a predetermined sensor is used in performing such extraction, for example.

Information obtained from an acceleration sensor or a GPS sensor may be used, for example, so that a certain frame is extracted. In a case where moving images taken with an imaging device 401 equipped with an acceleration sensor are the current targets to be processed, a scene with a change in the situation, such as a jump or a rapid change in the moving speed, is detected from information supplied from the acceleration sensor, and the scene may be extracted as a certain frame.

In step S521, feature points are detected from respective moving images. However, the information to be used for in the detection may be information obtained from various sensors or the like.

In step S522, a check is made to determine whether there is a moving image in which the number of feature points is equal to or smaller than a threshold value. If it is determined in step S522 that there is a moving image in which the number of feature points is equal to or smaller than the threshold value, the process moves on to step S523.

In step S523, the moving image in which the number of feature points is determined to be equal to or smaller than the threshold value is removed from the moving images as the current targets to be processed at the time of path generation. Then, in step S524, information about the detected feature points is added to the metadata of the moving images as the current targets to be processed.

Referring again to FIG. 27, such a process is described. For example, in a case where the number of feature points extracted from the moving image taken with the imaging device 401-5 is equal to or smaller than a predetermined threshold value in the example shown in FIG. 27, the moving image taken with the imaging device 401-5 is removed from the moving images as the current targets to be processed at the time of path generation.

Thus, as the moving images that are the current targets to be processed are narrowed down in accordance with the numbers of feature points, the number of moving images as the current targets to be processed at the time of path generation can be reduced. Thus, the processing time can be shortened, and the processing capacity related to the processes can be lowered.

It should be noted that, although the moving images as the current targets to be processed are narrowed down in accordance with the numbers of feature points in the above described case, the moving images may be narrowed down in accordance with some other condition. For example, in a case where the sum of the scores of the feature points extracted from a moving image is equal to or smaller than a predetermined value, the moving image may be removed from the current targets to be processed, and thus, the current targets to be processed may be narrowed down.

After feature points are extracted, and the moving images as the current targets to be processed are narrowed down in the above manner, a path generation process is performed on the narrowed moving images as the current targets to be processed. That is, after feature points are extracted in step S501 (FIG. 31), the process moves on to step S502, and a path generation process starts.

The path generation process in step S502 is performed in accordance with the flowcharts shown in FIGS. 11 through 15. The flowcharts shown in FIGS. 11 through 15 show the processes related to the path generation in a case where still images are the current targets to be processed. That is, when moving images are the current targets to be processed, a process of generating a path that connects feature points can be performed in a manner similar to that in a process of generating a path that connects feature points in a case where still images are the current targets to be processed. Explanation with reference to the flowcharts shown in FIGS. 11 through 15 has already been made, and therefore, such explanation is not provided herein.

After a path is generated in step S502, the process moves on to step S503. In step S503, the generated path is presented to the user. In step S504, information about editing of the path performed by the user is accepted. The processes in steps S503 and S504 can be performed in a manner similar to that in steps S103 and S104 in FIG. 9, and therefore, explanation of them is not repeated herein.

As described above, in a case where moving images are to be processed, a path can be generated through a process similar to that for still images.

<Second Process for Moving Images>

Next, another method of generating a path for moving images is described. In the above described first process for moving images, the feature point extraction process is performed in step S501 (FIG. 31), so that the moving images (imaging devices) as the current targets to be processed are narrowed down.

Figure 33:
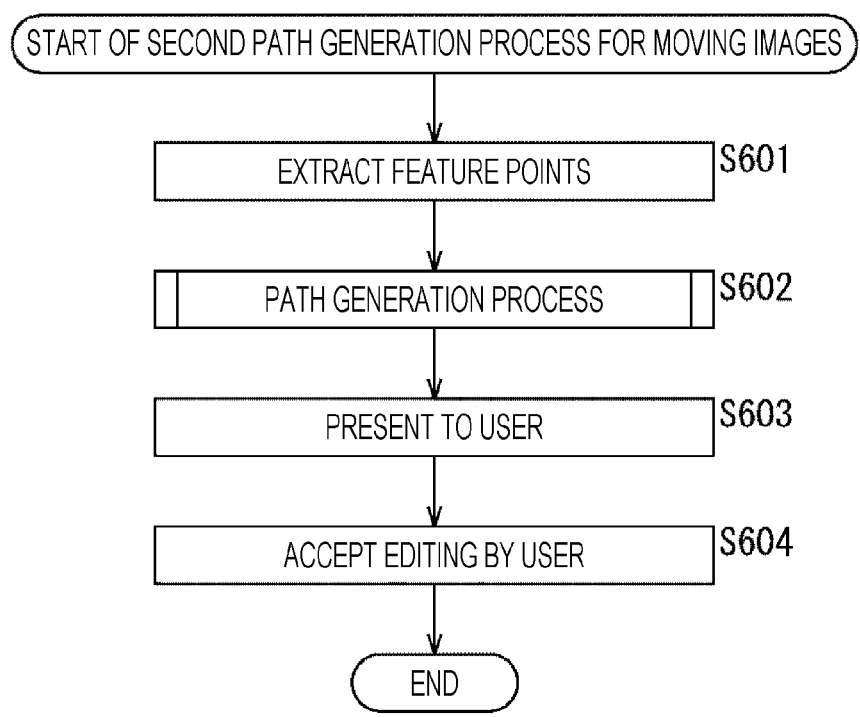
FIG. 33 is a flowchart for explaining a second path generation process for moving images.

In a second process for moving images, the imaging devices as the current targets to be processed are not narrowed down, and a path is generated. FIG. 33 is a flowchart for explaining the second process for moving images.

In step S601, a feature point extraction process is performed. This process can be performed in a manner similar to that in step S521 (FIG. 32) of the first process for moving images, and therefore, explanation thereof is not repeated herein.

After feature points are extracted, the process moves on to step S602, and a path generation process is performed. The processes in step S602 and the later steps can be performed in a manner similar to that in the first process for moving images, and therefore, explanation thereof is not repeated herein.

In this manner, a path can be generated, even though the imaging devices as the current targets to be processed are not narrowed down. Also, even though the imaging devices are not narrowed down before path generation is started, a process of removing the imaging devices that have taken characterless images is performed at the time of a global path generation process or at the time of a local path generation process, for example. Thus, the imaging devices are appropriately narrowed down.

A path may also be generated in such a manner.

<Third Process for Moving Images>

Next, another method of generating a path for moving images is described. In a third process for moving images, a feature point extraction process is performed as in the above described first process for moving images, so that the moving images (imaging devices) as the current targets to be processed are narrowed down. Further, in the third process for moving images, an effect period is set, and different paths are generated between the effect period and the periods that are not effect periods.

Figure 34:
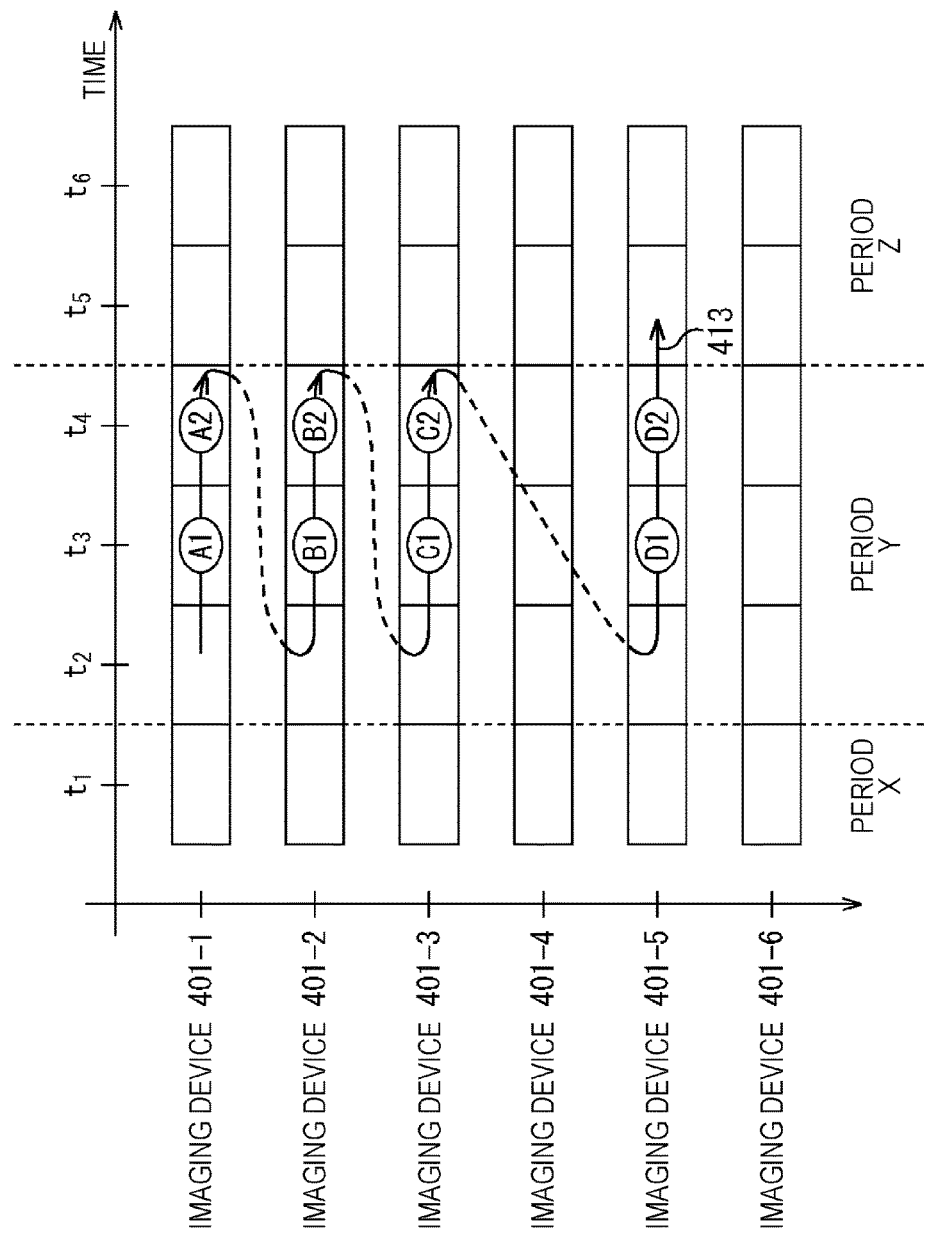
FIG. 34 is a diagram for explaining an effect period.

Referring now to FIG. 34, this effect period and the periods that are not effect periods are described. In the description below, the periods that are not effect periods will be referred to as non-effect periods.

FIG. 34 is a diagram that adds an effect period and non-effect periods to the diagram shown in FIG. 29 for explaining an example of a path to be generated. As described above with reference to FIG. 29, a path 413 generated for images taken in the periods t2 through t4 is a path for achieving an effect such as multi-angle single-scene display in which images taken in the same period are repeatedly displayed.

A period in which such a path 413 is generated is an effect period. That is, an effect period is a period in which some effect process is performed as a path. For example, a period in which a visual effect such as a time-slice (bullet-time) effect is provided as described above with reference to FIG. 30 is also an effect period.

In FIG. 34, a period Y is an effect period. In the drawing, the period X before the period Y and the period Z after the period Y are non-effect periods. In this explanation that will be continued below, an example case where the periods before and after an effect period are non-effect period is described. However, there may be successive effect periods. In the example shown in FIG. 34, the period Z may also be set as an effect period in which a time-slice effect is given, for example.

In this explanation that will be continued below, a period in which an effect called multi-angle single-scene display is provided is described as an example of an effect period. As described above with reference to FIG. 29, a scene for which the multi-angle single-scene display is displayed is a scene in which a large number of feature points are extracted from moving images taken with multiple imaging devices 401 in the same short period. A period in which a large number of feature points are extracted with multiple imaging devices 401 from the same short period is detected as an effect period.

Figure 35:
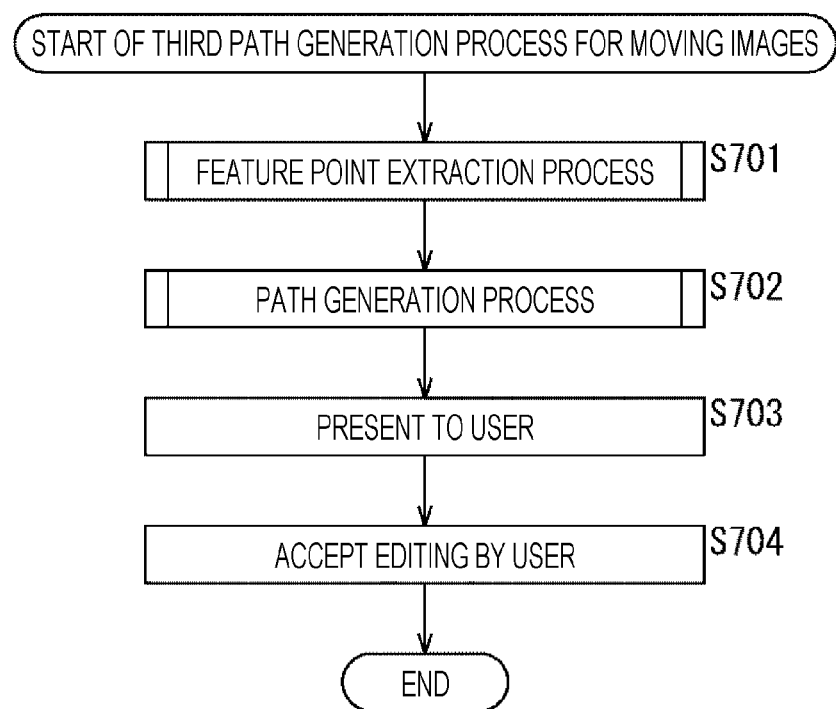
FIG. 35 is a flowchart for explaining a third path generation process for moving images.

Referring now to the flowchart shown in FIG. 35, the third process for moving images from which such an effect period is detected is described.

In step S701, a feature point extraction process is performed. In step S702, a path is generated. In step S703, the generated path is presented to the user. In step S704, editing of the path by the user is accepted. The flow in this process is similar to that in the first process for moving images described above with reference to the flowchart shown in FIG. 31.

Figure 36:
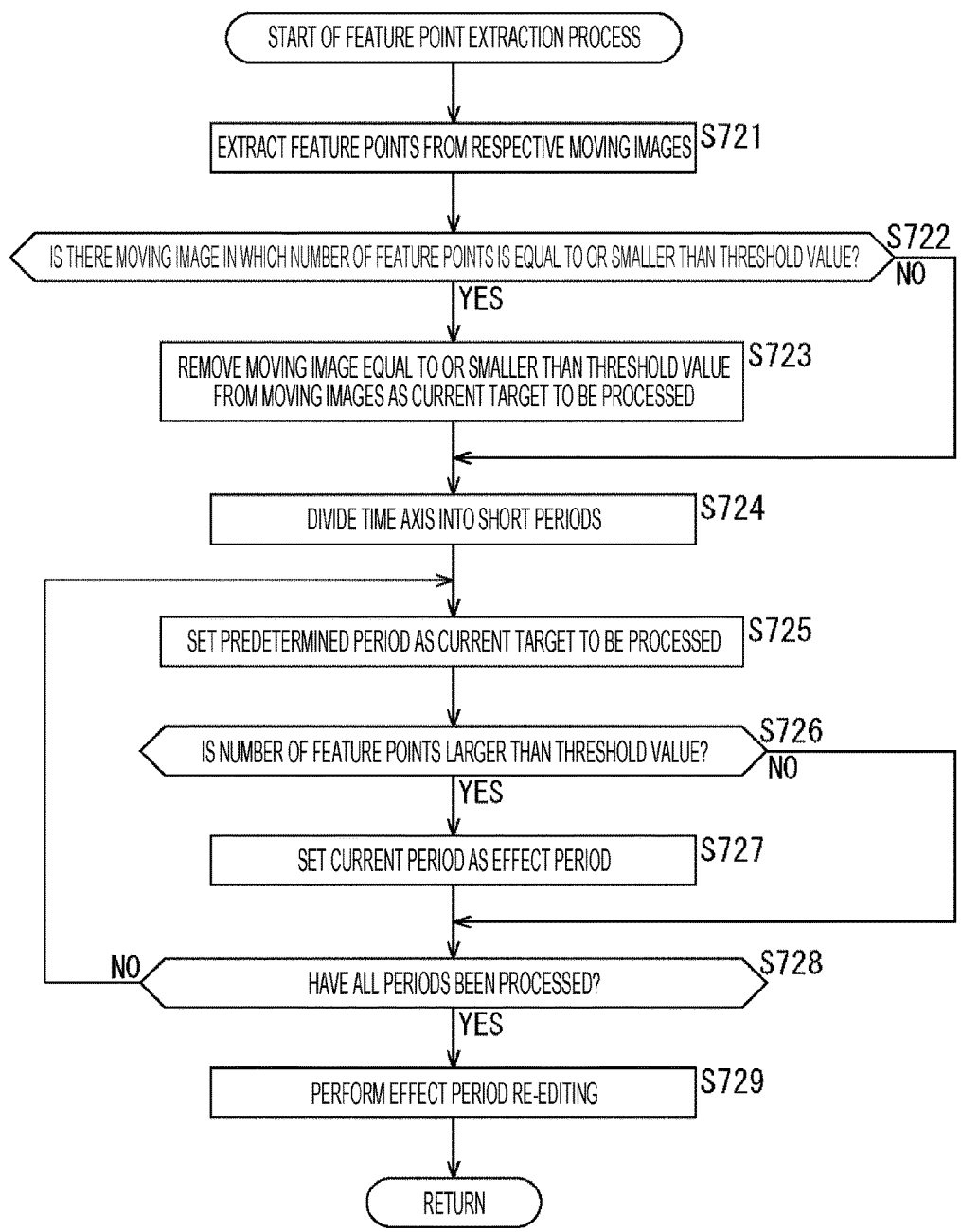
FIG. 36 is a flowchart for explaining the third path generation process for moving images.

Referring now to the flowchart shown in FIG. 36, the feature point extraction process to be performed in step S701 is described. The feature point extraction process in the third process for moving images includes a process of extracting feature points from respective moving images, a process of narrowing down the moving images as the current targets to be processed, and a process of detecting an effect period.

The processes in steps S721 through S723 are the process of extracting feature points from the respective moving images, and the process of narrowing down the moving images as the current targets to be processed. The processes in steps S721 through S723 are performed in a manner similar to that in the processes in steps S521 through S523 in the flowchart shown in FIG. 32, and therefore, detailed explanation thereof is not made herein.

In step S724, the time axis is divided into short periods. A short period is a predetermined time, such as a few frames, a few seconds, or a few minutes. In step S725, a predetermined short period among the divided short periods is set as the current target to be processed. For example, the periods starting from the beginning of moving images are sequentially set timewise as the current targets to be processed.

In step S726, a check is made to determine whether the number of the feature points in the short period set as the current target to be processed is larger than a threshold value. If the number of the feature points in the short period set as the current target to be processed is determined to be larger than the threshold value in step S726, the process moves on to step S727, and the short period set as the current target to be processed is set as an effect period.

In step S728, a check is made to determine whether all the short periods have been processed. If it is determined that there is a short period that has not been processed, the process returns to step S725, and the processes thereafter are repeated.

If the number of the feature points in the short period set as the current target to be processed is determined not to be larger than the threshold value in step S726, on the other hand, the process in step S727 is skipped, and the process moves on to step S728. A check is then made to determine whether all the short periods have been processed.

It should be noted that, if the number of the feature points in the short period set as the current target to be processed is determined not to be larger than the threshold value in step S726, the short period is set as a non-effect period.

If it is determined in step S728 that all the short periods have been processed, the process moves on to step S729. In step S729, effect period re-editing is performed. As the processes in steps S725 through S728 are repeated, an effect period or a non-effect period is set for each short period. In step S729, a portion in which successive short periods are set as effect periods is re-edited into one effect period, for example.

Referring again to FIG. 34, the processes in steps S724 through S729 are further described. In FIG. 34, one period t is one short period, and is a predetermined period, such as one frame or a few frames. For ease of explanation, the period t1 is written as the short period t1, for example. Also, in the description that will be continued below, the images taken with the respective imaging devices 401-1 through 401-6 are set as the current images to be processed as a result of narrowing down of the current images to be processed.

In step S724, the time axis is divided into short periods t1 through t6, as shown in FIG. 34. In step S725, the short period t1 is first set as the current period to be processed. Since any feature point is not extracted from the images taken with the respective imaging devices 401-1 through 401-6 in the short period t1, the number of feature points is determined not to be larger than the threshold value in step S726, and the short period t1 is set as a non-effect period.

In such a flow of processing, the short period t2, the short period t5, and the short period t6 are also set as non-effect periods. It should be noted that a non-effect period is a period that is not an effect period, and therefore, any period that has not been set as an effect period is regarded as a non-effect period. In view of this, a process of setting a period as a non-effect period does not need to be performed on non-effect periods.

After the short period t2 is processed, the short period t3 is set as the current short period to be processed in step S725. In step S726, a check is made to determine whether the number of the feature points in the short period t3 is larger than the threshold value. The number of the feature points in the short period t3 is four. In a case where the threshold value is three, for example, the short period t3 is determined to be a period in which the number of feature points is larger than the threshold value in step S726.

In step S726, the short period t3 is then set as an effect period. In such a flow of processing, the short period t4 is also set as an effect period.

As each of the short periods t1 through t6 is set as an effect period or a non-effect period in this manner, effect period re-editing is performed in step S729. The short periods set as effect periods are the short period t3 and the short period t4. As the effect period re-editing is performed, the short period t3 and the short period t4 are combined into one effect period.

If a period set as an effect period is a period in which an effect called multi-angle single-scene display is provided, the same scene is repeatedly provided to the user through different images during the period. Only the images from which feature points have been extracted may be successively connected so that multi-angle single-scene display is repeated. However, when images taken with different imaging devices 401 are switched, multi-angle single-scene display may be started from an image taken at a slightly earlier point of time.

As shown in FIG. 34, no feature points have been extracted in the short period t2 that exists before the short period t3 in terms of time, and therefore, the short period t2 is set as a non-effect period. However, the short period t2 may be added to the effect period by the effect period re-editing process in step S729.

Specifically, the short period t2, the short period t3, and the short period t4 are set as one effect period in this case. In a case where an effect called multi-angle single-scene display is provided during this effect period, the images taken with the imaging device 401-1 in the period t3 and the period t4 are displayed, and the images taken with the imaging device 401-2 in the period t2, the period t3, and the period t4 are then displayed.

Likewise, after the images taken with the imaging device 401-2 in the period t2, the period t3, and the period t4 are displayed, the images taken with the imaging device 401-3 in the period t2, the period t3, and the period t4 are displayed. As described above, when images taken with different imaging devices 401 are switched from one to another, re-editing may be performed so that the short period before the period set as the effect period is added to the effect period.

Meanwhile, successive short periods set as non-effect periods are re-edited into one non-effect period.

In this manner, the moving images set as the current targets to be processed are divided into an effect period and non-effect periods. The feature point extraction process including such a process is performed in step S701 (FIG. 35). After the feature point extraction process is completed, the process moves on to step S702. In step S702, a path generation process is performed.

Figure 37:
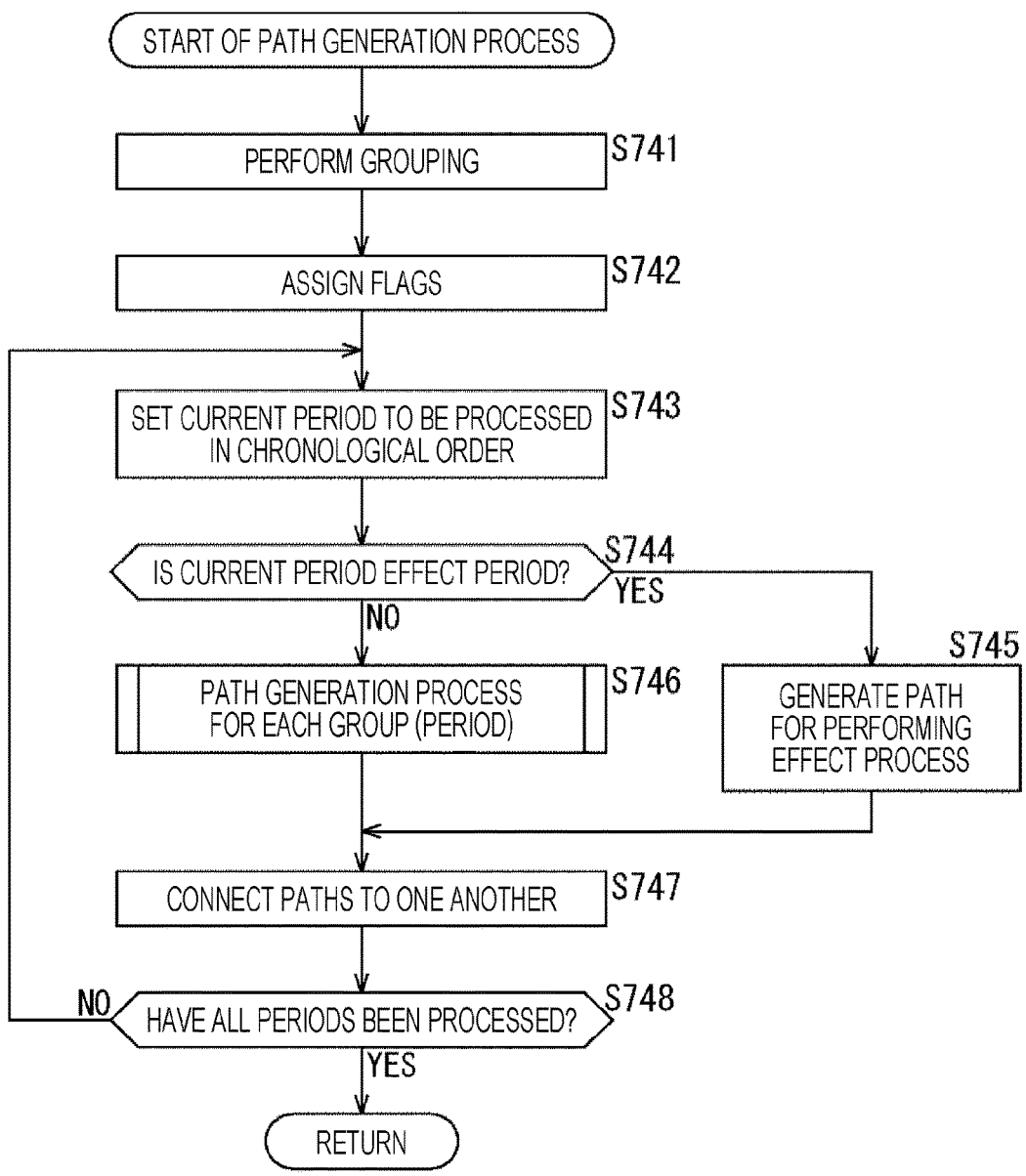
FIG. 37 is a flowchart for explaining the third path generation process for moving images.

Referring now to the flowchart shown in FIG. 37, the path generation process to be performed in step S702 is described.

In step S741, a check is made to determine to which group each imaging device 401 belongs, an isolated group or a unified group. In this manner, the imaging devices 401 are divided into groups. A fuzzy flag or an exact flag is then assigned to each of the divided groups.

The processes in steps S741 and S742 are performed in a manner similar to that in the processes in steps S121 and S122 in the flowchart shown in FIG. 11, and therefore, explanation thereof is not made herein.

In step S743, the current period to be processed is set in chronological order. The period that is set as the current period to be processed is an effect period or a non-effect period.

In step S744, a check is made to determine whether the current period to be processed is an effect period. If the current period to be processed is determined to be an effect period in step S744, the process moves on to step S745. In step S745, a path for performing an effect process is generated.

For example, as shown in FIG. 34, the period Y is an effect period. When this period Y is the current period to be processed, a path 413 for providing an effect called multi-angle single-scene display is generated.

If the current period to be processed is determined not to be an effect period in step S744 or if the current period to be processed is determined to be a non-effect period, on the other hand, the process moves on to step S746.

In step S746, a path generation process for each group is performed. In the case of a non-effect period, a path that connects feature points is generated as in the first process for moving images. Referring again to FIG. 34, the period X and the period Z are non-effect periods, and a path that connects feature points is generated in each of these non-effect periods, for example.

A path that connects feature points is like the path 411 described above with reference to FIG. 27, for example. The path 411 shown in FIG. 27 is a path 411 that connects the feature point A1 extracted from an image taken with the imaging device 401-1, the feature point C1 extracted from an image taken with the imaging device 401-3, and the feature point A3 extracted from an image taken with the imaging device 401-1. In this manner, a path that connects feature points is generated in a non-effect period.

The path generation process in step S746 is performed in accordance with the flowcharts shown in FIGS. 11 through 15. The flowcharts shown in FIGS. 11 through 15 show the processes related to the path generation in a case where still images are the current targets to be processed. That is, when moving images are the current targets to be processed, a process of generating a path that connects feature points in a non-effect period can be performed in a manner similar to that in a process of generating a path that connects feature points in a case where still images are the current targets to be processed. Explanation with reference to the flowcharts shown in FIGS. 11 through 15 has already been made, and therefore, such explanation is not provided herein.

In step S747, the paths are connected to one another. The starting point of the current generated path is connected to the ending point of the last generated path. For example, in FIG. 34, the path 413 generated in the period Y as the effect period is connected to the path (not shown) in the period X before the period Y.

More specifically, the ending point of the path generated in the period X (or the image through which the path extends in the period t1) is connected to the starting point of the path generated in the period Y (or the image taken with the imaging device 401-1 in the period t2 in FIG. 34).

This is further described, with reference to the example show in FIG. 34. In a case where the ending point of the path generated in the period X and the starting point of the path generated in the period Y are at a distance from each other, or where the image through which the path extends in the period t1 is the image taken with the imaging device 401-6 in the period t1, and this image is to be connected to the image taken with the imaging device 401-1 in the period t2, the fade-out and fade-in effects described above with reference to FIG. 28 may be used in connecting the images.

As described above, the process for connecting paths to one another in step S747 may include a process of connecting paths to one another through an effect.

After the paths are connected to one another in step S747, the process moves on to step S748. In step S748, a check is made to determine whether all the periods have been processed. If it is determined in step S748 that there is an effect period or a non-effect period that has not been processed, the process returns to step S743. The period that is the next period in terms of time is set as the current period to be processed, and the processes in step S744 and the later steps are repeated for the newly set period.

If it is determined in step S748 that all the periods have been processed, on the other hand, the path generation process shown in FIG. 37 comes to an end, and the process moves on to step S703 (FIG. 35).

As described above with reference to the flowchart shown in FIG. 37, the path generation process for each group in step S746 is performed only for non-effect periods. In other words, a path for providing an effect is generated in an effect period, while a path is generated for each group in accordance with a result of grouping in a non-effect period as in a case with still images.

In view of this, a flow of processing may be designed so that a grouping process is performed only in non-effect periods and is not performed in any effect period. An example of a flowchart showing such a flow of processing is shown in FIG. 38.

Figure 38:
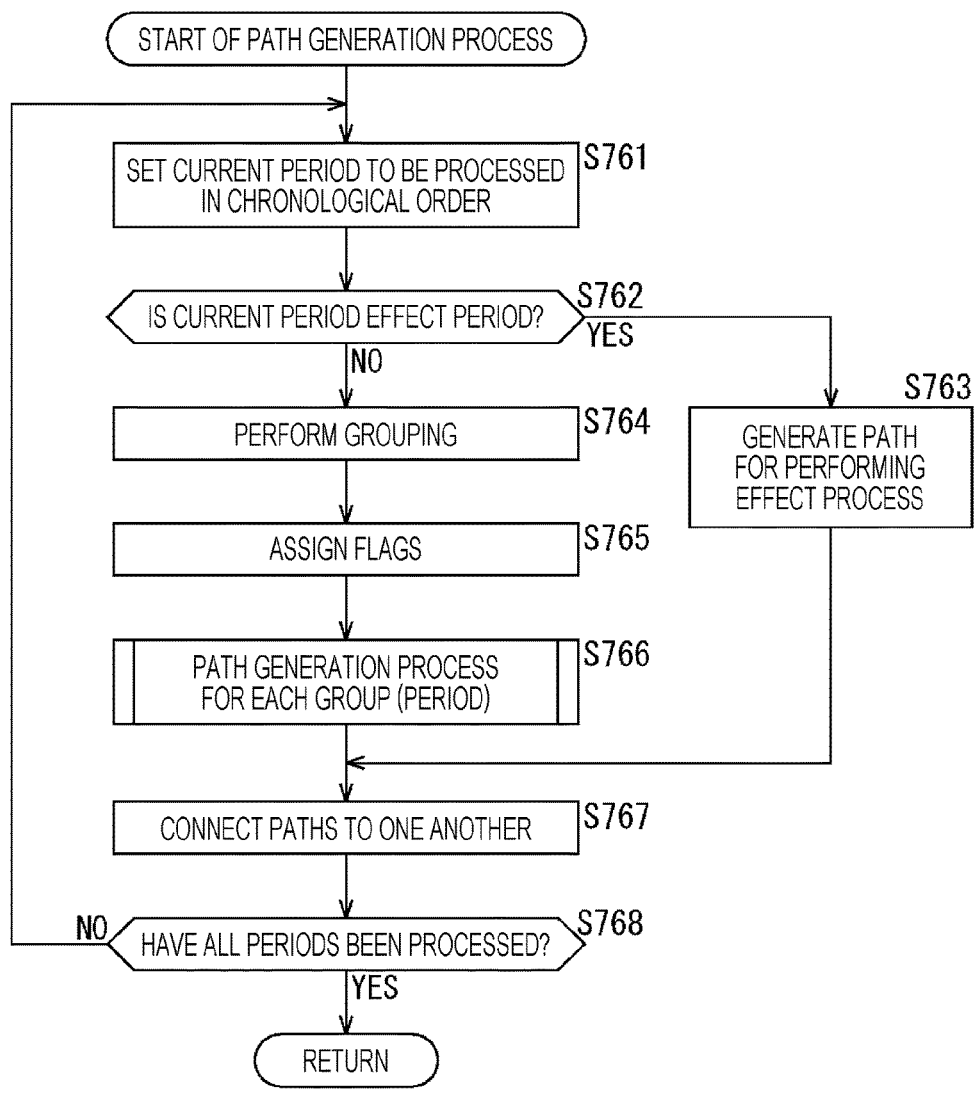
FIG. 38 is a flowchart for explaining the third path generation process for moving images.

The flowchart shown in FIG. 38 is another example of the path generation process to be performed in step S702.

In step S761, the current period to be processed is set in chronological order. This process in step S761 is equivalent to the process in step S743 in the flowchart shown in FIG. 37.

In step S762, a check is made to determine whether the period set as the current period to be processed is an effect period. If the current period to be processed is determined to be an effect period in step S762, the process moves on to step S763. In step S763, a path for performing an effect process is generated. These processes in steps S762 and S763 are equivalent to the processes in steps S744 and S745 in the flowchart shown in FIG. 37.

If the period set as the current period to be processed is determined not to be an effect period in step S762 or if the current period to be processed is determined to be a non-effect period, on the other hand, the process moves on to step S764.

In step S764, grouping is performed. In step S765, flags are assigned to the respective groups. These processes in steps S764 and S765 are equivalent to the processes in steps S741 and S742 in the flowchart shown in FIG. 37.

As described above, in a case where the current period to be processed is a non-effect period, grouping may be performed, and a path is then generated.

The processes in steps S766 through S768 are similar to the processes in steps S746 through S748 in the flowchart shown in FIG. 37, and therefore, explanation thereof is not made herein.

As described above, in the third process for moving images, after the moving images as the current targets to be processed are narrowed down, time is divided into an effect period and non-effect periods, and a path is generated in each of these periods.

<Fourth Process for Moving Images>

Next, another method of generating a path for moving images is described. In the above described third process for moving images, the feature point extraction process is performed in step S701 (FIG. 35), so that the moving images (imaging devices) as the current targets to be processed are narrowed down.

Figure 39:
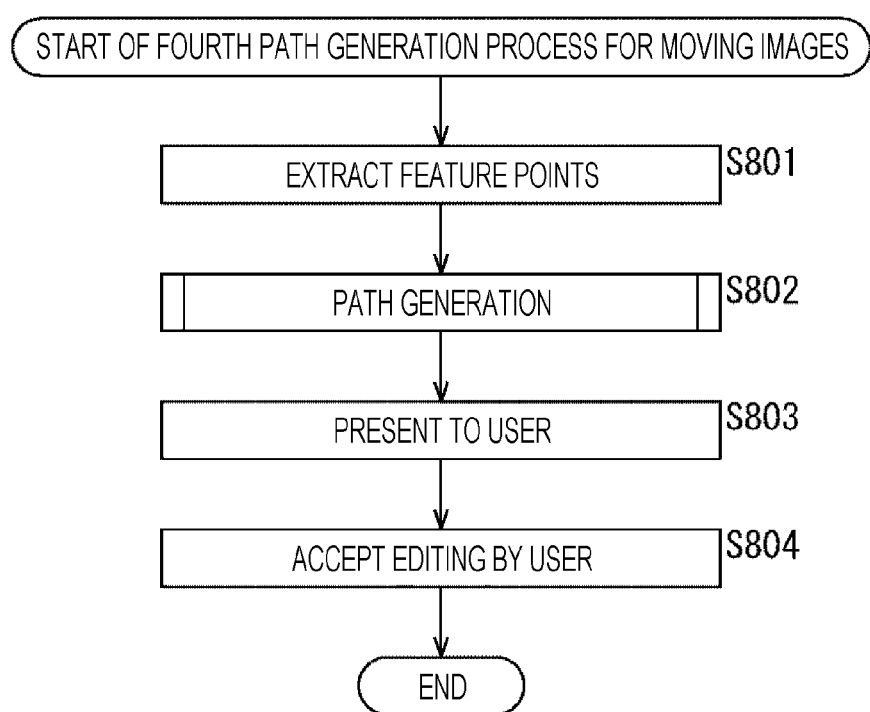
FIG. 39 is a flowchart for explaining a fourth path generation process for moving images.

In a fourth process for moving images, the imaging devices as the current targets to be processed are not narrowed down, and a path is generated. FIG. 39 is a flowchart for explaining the fourth process for moving images.

In step S801, a feature point extraction process is performed. This process can be performed in a manner similar to that in step S721 (FIG. 36) of the third process for moving images, and therefore, explanation thereof is not repeated herein.

After feature points are extracted, the process moves on to step S802, and a path generation process is performed. The processes in step S802 and the later steps can be performed in a manner similar to that in the third process for moving images, and therefore, explanation thereof is not repeated herein.

In this manner, a path can be generated, even though the imaging devices as the current targets to be processed are not narrowed down. Also, even though the imaging devices are not narrowed down before path generation is started, a process of removing the imaging devices that have taken characterless images is performed at the time of a global path generation process or at the time of a local path generation process, for example. Thus, the imaging devices are appropriately narrowed down.

A path may also be generated in such a manner.

As described so far, the present technology enables generation of a path for successively presenting characteristic images to a user without troubling the user, regardless of whether the images are still images or are moving images.

It should be noted that, although a path is generated in the above described manner, some of the images existing in the path may be formed by combining images taken with multiple imaging devices, or may be generated by computer graphics (CG) or the like. For example, when a transition is made from a first image taken with a first imaging device existing in a path to a second image taken with a second imaging device, the image in between may be generated by combining the first image and the second image.

Also, modeling may be performed in accordance with three-dimensional information, and, as necessary, an image may be generated through image synthesis such as CG. The generated image may be used as an image in an image group that forms part of a path.

An image in an image group existing in a path may be an image extracted (cut out) from an image taken with an imaging device, or may be an image generated by combining images.

It should be noted that, in this specification, a system means an entire apparatus formed with more than one device.

It should be noted that the advantageous effects described in this specification are merely examples, and the advantageous effects of the present technology are not limited to them or may include other effects.

It should be noted that embodiments of the present technology are not limited to the above described embodiments, and various modifications may be made to them without departing from the scope of the present technology.

It should be noted that the present technology may also be embodied in the configurations described below.

(1)

An information processing device including
a setting unit that sets a path for connecting characteristic portions in at least one image by referring to metadata including at least information about a plurality of feature points detected from the image.

(2)

The information processing device of (1), wherein the setting unit sets the path by determining a regression curve, using the feature points.

(3)

The information processing device of (2), wherein, when the feature points include a feature point at a distance equal to or longer than a predetermined threshold value from the regression curve, the setting unit redetermines the regression curve after removing a feature point detected from an image including a feature point having a low score among the feature points.

(4)

The information processing device of (2), wherein, when the feature points include a feature point at a distance equal to or longer than a predetermined threshold value from the regression curve, the setting unit redetermines the regression curve after removing a feature point having a low score among the feature points.

(5)

The information processing device of any of (1) through (4), wherein the setting unit determines a regression curve by using the feature points, divides the determined regression curve into a plurality of sections, determines differential values for the respective sections, and, when at least one of the differential values is equal to or smaller than a predetermined threshold value, redetermines the regression curve after increasing the order for determining the regression curve.

(6)

The information processing device of (1), wherein the image is a moving image.

(7)

The information processing device of (6), wherein the setting unit sets an effect period for providing an effect, the effect period being a period in which feature points in a divisional period obtained by dividing the moving image into a plurality of periods satisfy a predetermined condition.

(8)

The information processing device of (7), wherein the predetermined condition is that the number of feature points in the divisional period is equal to or larger than a threshold value.

(9)

The information processing device of (7) or (8), wherein the effect is a time-slice effect.

(10)

The information processing device of any of (7) through (9), wherein the effect is an effect to display a scene captured from different angles in the same period.

(11)

The information processing device of any of (7) through (10), wherein the setting unit sets a chronological path outside the effect period.

(12)

The information processing device of any of (1) through (11), wherein, when there are a plurality of the images, and the images are classified into a unified group including an image having an imaging range overlapping an imaging range of another image and an isolated group having an imaging range not overlapping an imaging range of another image, the setting unit sets a global path for all the images in the unified group, and sets a local path for each image in the unified group.

(13)

An information processing method including the step of setting a path for connecting characteristic portions in at least one image by referring to metadata including at least information about a plurality of feature points detected from the image.

(14)

A computer-readable program for causing a computer to perform a process including the step of setting a path for connecting characteristic portions in at least one image by referring to metadata including at least information about a plurality of feature points detected from the image.

REFERENCE SIGNS LIST

201 Network
202 Imaging device
203 Server
204 Information processing device
261 Image data acquisition unit
262 Feature point extraction unit
263 Metadata acquisition unit
264 Metadata reference unit
265 Metadata edit unit
267 Imaging device extraction unit
268 Grouping unit
269 Flag adding unit
270 Path generation unit
271 Presentation unit
272 Editing unit
291 Global path generation unit
292 First local path generation unit
293 Second local path generation unit
294 Edit file creation unit

The invention claimed is:

1. An information processing device comprising:
   a processor; and
   a memory, the memory storing program code executable by the processor to perform operations comprising:
   setting a viewing path for connecting characteristic portions in an image by referring to metadata including at least information about a plurality of feature points detected from the image,
   wherein the viewing path is arranged for successively viewing different fields of view within the image with progression along the viewing path, and wherein the viewing path includes one or more of the characteristic portions, and
   setting the viewing path comprises determining a regression curve using the feature points.

2. The information processing device according to claim 1, wherein, when the feature points include a feature point at a distance equal to or longer than a predetermined threshold value from the regression curve, setting the viewing path comprises re-determining the regression curve after removing a feature point that has a low score among the feature points.

3. The information processing device according to claim 1, wherein setting the viewing path further comprises dividing the determined regression curve into a plurality of sections, determining differential values for the respective sections, and, when at least one of the differential values is equal to or smaller than a predetermined threshold value, re-determining the regression curve after increasing an order for determining the regression curve.

4. The information processing device according to claim 1, wherein the image is a moving image.

5. The information processing device according to claim 1, wherein the image is one of a plurality of images, and the viewing path connects characteristic portions respectively included in the plurality of images.

6. An information processing method comprising:
   setting a viewing path for connecting characteristic portions an image by referring to metadata including at least information about a plurality of feature points detected from the image,
   wherein the viewing path is arranged for successively viewing different fields of view within the image along the viewing path, and wherein the viewing path includes one or more of the characteristic portions, and
   setting the viewing path comprises determining a regression curve using the feature points.

7. The method according to claim 6, wherein, when the feature points include a feature point at a distance equal to or longer than a predetermined threshold value from the regression curve, setting the viewing path comprises re-determining the regression curve after removing a feature point detected from an image including a feature point having a low score among the feature points.

8. The method according to claim 6, wherein the image is a moving image.

9. A non-transitory computer-readable medium storing a program, the program being executable by a processor to perform operations comprising:

setting a viewing path for connecting characteristic portions an image by referring to metadata including at least information about a plurality of feature points detected from the image, wherein the viewing path is arranged for successively viewing different fields of view within the image along the viewing path, and wherein the viewing path includes one or more of the characteristic portions, and setting the viewing path comprises determining a regression curve using the feature points.

10. The computer readable medium according to claim 9, wherein, when the feature points include a feature point at a distance equal to or longer than a predetermined threshold value from the regression curve, setting the viewing path comprises re-determining the regression curve after removing a feature point detected from an image including a feature point having a low score among the feature points.

11. The computer readable medium according to claim 9, wherein the image is a moving image.

12. An information processing device comprising:
a processor; and
a memory, the memory storing program code executable by the processor to perform operations comprising:
setting a viewing path for connecting characteristic portions in an image by referring to metadata including at least information about a plurality of feature points detected from the image,
wherein the viewing path is arranged for successively viewing different fields of view within the image with progression along the viewing path, and wherein the viewing path includes one or more of the characteristic portions, wherein the image is a moving image, and
setting the viewing path comprises setting an effect period for providing an effect, the effect period being a period in which feature points in a divisional period obtained by dividing the moving image into a plurality of periods satisfy a predetermined condition.

13. The information processing device according to claim 12, wherein the predetermined condition is that the number of feature points in the divisional period is equal to or larger than a threshold value.

14. The information processing device according to claim 12, wherein the effect is a time-slice effect.

15. The information processing device according to claim 12, wherein the effect is an effect to display a scene captured from different angles in the same period.

16. The information processing device according to claim 12, wherein setting the viewing path comprises setting a chronological path outside the effect period.

17. An information processing device comprising:
a processor; and
a memory, the memory storing program code executable by the processor to perform operations comprising:
setting a viewing path for connecting characteristic portions in an image by referring to metadata including at least information about a plurality of feature points detected from the image,
wherein the viewing path is arranged for successively viewing different fields of view within the image with progression along the viewing path, and wherein the viewing path includes one or more of the characteristic portions,
the image is one of a plurality of the images,
the images are classified into a unified group including an image having an imaging range overlapping an imaging range of another image and an isolated group having an imaging range not overlapping an imaging range of another image, and
setting the viewing path comprises setting a global path for all images in the unified group, and setting a local path for each image in the unified group.

* * * * *